(12) United States Patent
Zheng et al.

(10) Patent No.: US 12,487,704 B2
(45) Date of Patent: Dec. 2, 2025

(54) DISPLAY PANEL AND DISPLAY DEVICE

(71) Applicant: BOE Technology Group Co. Ltd., Beijing (CN)

(72) Inventors: Meizhu Zheng, Beijing (CN); Yuanyuan Li, Beijing (CN); Zewen Bo, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/695,393

(22) PCT Filed: Oct. 28, 2022

(86) PCT No.: PCT/CN2022/128352
§ 371 (c)(1),
(2) Date: Mar. 26, 2024

(87) PCT Pub. No.: WO2024/087195
PCT Pub. Date: May 2, 2024

(65) Prior Publication Data
US 2024/0338096 A1 Oct. 10, 2024

(51) Int. Cl.
*G06F 3/041* (2006.01)
*G06F 3/044* (2006.01)
(Continued)

(52) U.S. Cl.
CPC .......... *G06F 3/0418* (2013.01); *G06F 3/0412* (2013.01); *G06F 3/04164* (2019.05);
(Continued)

(58) Field of Classification Search
None
See application file for complete search history.

(56) References Cited

U.S. PATENT DOCUMENTS

2023/0143393 A1* 5/2023 Ha .................. G06F 3/044
345/173

FOREIGN PATENT DOCUMENTS

CN 203930729 U * 11/2014
CN 105353920 A 2/2016
(Continued)

OTHER PUBLICATIONS

International Search Report of PCT application No. PCT/CN2022/128352 dated Jul. 4, 2023.
(Continued)

*Primary Examiner* — Duane N Taylor, Jr.
(74) *Attorney, Agent, or Firm* — Calfee, Halter & Griswold LLP

(57) ABSTRACT

A display panel and a display device are provided. The display panel includes a display substrate, a touch layer group, and a shielding layer. The display substrate includes a first electrode. The touch layer group is arranged on a light output side of the display substrate. The touch layer group includes a touch body part and a touch connection wire. The touch connection wire is connected to the touch body part. The shielding layer is arranged between the first electrode and the touch layer group. The shielding layer includes a shielding body part and a shielding connection wire. The shielding connection wire is connected to the shielding body part. A width of the shielding connection wire is greater than a width of the touch connection wire.

25 Claims, 17 Drawing Sheets

(51) Int. Cl.
*H10K 59/131* (2023.01)
*H10K 59/40* (2023.01)

(52) U.S. Cl.
CPC .......... *G06F 3/0443* (2019.05); *G06F 3/0446* (2019.05); *H10K 59/131* (2023.02); *H10K 59/40* (2023.02); *G06F 2203/04107* (2013.01); *G06F 2203/04111* (2013.01)

(56) References Cited

FOREIGN PATENT DOCUMENTS

| | | |
|---|---|---|
| CN | 109992160 A | 7/2019 |
| CN | 110502150 A | 11/2019 |
| CN | 112860095 A | 5/2021 |
| CN | 113672129 A | 11/2021 |
| CN | 114664909 A | 6/2022 |
| CN | 114675758 A | 6/2022 |

OTHER PUBLICATIONS

Written Opinion of PCT application No. PCT/CN2022/128352 dated Jul. 4, 2023.

\* cited by examiner

DISPLAY PANEL AND DISPLAY DEVICE

CROSS REFERENCE TO RELATED APPLICATIONS

The present disclosure is the U.S. national phase application of International Application No. PCT/CN2022/128352 filed on Oct. 28, 2022, the content of which is incorporated herein by reference in its entirety for all purposes.

TECHNICAL FIELD

The present disclosure relates to the field of display technology, in particular to a display panel and a display device.

BACKGROUND

The organic light-emitting diode (OLED) display panel has advantages of self-illumination, high brightness, good image quality, and low energy consumption, and has become a mainstream development direction in the field of display technology. The on-cell technology is gradually replacing the existing plug-in style in the touch screen panel (TSP). The on-cell technology is an integrated touch display technology that utilizes lithography process to form touch electrodes and wirings on the encapsulation layer.

It should be noted that the information disclosed in the above section is only used to enhance the understanding of the background of the present disclosure, and thus can include information that does not constitute the prior art already known to those of ordinary skill in the art.

SUMMARY

According to one aspect of the present disclosure, a display panel is provided, including: a display substrate including a first electrode; a touch layer group arranged on a light output side of the display substrate, wherein the touch layer group includes a touch body part and a touch connection wire, and the touch connection wire is connected to the touch body part; and a shielding layer arranged between the first electrode and the touch layer group, wherein the shielding layer includes a shielding body part and a shielding connection wire, the shielding connection wire is connected to the shielding body part, and a width of the shielding connection wire is greater than a width of the touch connection wire.

In some embodiments of the present disclosure, the shielding connection wire is provided as at least two shielding connection wires, and resistances of the at least two shielding connection wires are substantially the same.

In some embodiments of the present disclosure, the display panel includes a display area and one binding area, the binding area is arranged on one side of the display area, the shielding body part is arranged in the display area, and at least two binding pins are arranged in the binding area, and wherein the shielding connection wire includes: a first connection wire, wherein one end of the first connection wire is connected to the binding pins, and the other end of the first connection wire is connected to an end of the shielding body part close to the binding area; and a second connection wire, wherein one end of the second connection wire is connected to the binding pins, the other end of the second connection wire is connected to an end of the shielding body part away from the binding area, and a resistance of the second connection wire is substantially equal to a resistance of the first connection wire.

In some embodiments of the present disclosure, a length of the display area along a second direction is greater than a width of the display area along a first direction, the binding area is arranged on a side of the display area along the second direction, the first direction intersects with the second direction, and the first direction and the second direction are parallel to a surface of the display substrate close to the touch layer group.

In some embodiments of the present disclosure, the display panel includes a display area, a first binding area, and a second binding area, the first binding area and the second binding area are arranged on opposite sides of the display area, and the shielding body part is arranged in the display area, and wherein the shielding connection wire includes: a first connection wire, wherein one end of the first connection wire is connected to a binding pin in the first binding area, and the other end of the first connection wire is connected to an end of the shielding body part close to the first binding area; and a second connection wire, wherein one end of the second connection wire is connected to a binding pin in the second binding area, the other end of the second connection wire is connected to an end of the shielding body part close to the second binding area, and a resistance of the second connection wire is substantially equal to a resistance of the first connection wire.

In some embodiments of the present disclosure, a length of the display area along a second direction is greater than a width of the display area along a first direction, the first binding area and the second binding area are arranged on opposite sides of the display area along the second direction, the first direction intersects with the second direction, and the first direction and the second direction are parallel to a surface of the display substrate close to the touch layer group.

In some embodiments of the present disclosure, the display panel further includes a first side area and a second side area, the first side area and the second side area are arranged on opposite sides of the display area along a first direction, the binding area is arranged on at least one side of the display area along a second direction, and the first direction intersects with the second direction, and wherein the shielding connection wire further includes: a third connection wire, wherein one end of the third connection wire is connected to a binding pin in the binding area, and the other end of the third connection wire is connected to an end of the shielding body part close to the first side area; and a fourth connection wire, wherein one end of the fourth connection wire is connected to a binding pin in the binding area, the other end of the fourth connection wire is connected to an end of the shielding body part close to the second side area, a resistance of the third connection wire is equal to a resistance of the fourth connection wire, and the resistance of the third connection wire is equal to the resistance of the first connection wire.

In some embodiments of the present disclosure, the shielding connection wire is grounded or connected to a constant voltage terminal.

In some embodiments of the present disclosure, the display panel further includes: a signal generator connected to the shielding connection wire, wherein the signal generator is configured to provide a shielding signal to the shielding layer, the shielding signal is opposite to a data signal of the display substrate, and an amplitude of the shielding signal is smaller than an amplitude of the data signal.

In some embodiments of the present disclosure, the signal generator is a touch driver chip.

In some embodiments of the present disclosure, the shielding body part includes: multiple first metal wires interwoven to form multiple first grids, subpixels of the display substrate are located within orthographic projections of the first grids on the display substrate, and a width of the shielding connection wire is greater than a width of a first metal wire.

In some embodiments of the present disclosure, the touch body part includes: multiple second metal wires interwoven to form multiple second grids, the subpixels of the display substrate are located within orthographic projections of the second grids on the display substrate, and the width of the first metal wire is greater than or equal to a width of a second metal wire.

In some embodiments of the present disclosure, orthographic projections of the second metal wires on the display substrate are located within orthographic projections of the first metal wires on the display substrate.

In some embodiments of the present disclosure, the shielding layer further includes: a shielding connection part arranged around the shielding body part, wherein the shielding connection part is connected to a periphery of the shielding body part, and the shielding connection wire is connected to the shielding connection part.

In some embodiments of the present disclosure, a width of the shielding connection part is greater than a width of the touch connection wire.

In some embodiments of the present disclosure, an orthographic projection of the touch connection wire on the display substrate overlaps with an orthographic projection of the shielding connection part on the display substrate.

In some embodiments of the present disclosure, the display panel further includes: a noise reduction layer, wherein an orthographic projection of the noise reduction layer on the display substrate overlaps with the first electrode, and the orthographic projection of the noise reduction layer on the display substrate is located on a side of an orthographic projection of the shielding layer on the display substrate away from the display area.

In some embodiments of the present disclosure, the display panel further includes: a signal generator connected to the noise reduction layer, wherein the noise reduction layer is configured to provide a noise reduction signal opposite to a jumping direction of a data signal to the noise reduction layer.

In some embodiments of the present disclosure, an amplitude of the noise reduction signal $\Delta Vsl$ is $\Delta Vsl = -Cd*\Delta Vd/Csl$, where $Cd$ is a capacitance value of a capacitor formed between all data lines and the first electrode, $\Delta Vd$ is an average value of jumping voltages of data signals on the data lines, and $Csl$ is a capacitance value of a capacitor formed between the first electrode and the noise reduction layer.

In some embodiments of the present disclosure, the noise reduction layer and the shielding layer are arranged in the same layer and using the same material.

In some embodiments of the present disclosure, the display substrate includes: a base substrate; a driving backplane arranged on a side of the base substrate, wherein the driving backplane includes a source and a drain, the driving backplane further includes at least one connection conductor layer connected to the source or the drain, and the noise reduction layer is arranged in the same layer and using the same material as the connection conductor layer; a light-emitting substrate arranged on a side of the driving backplane away from the base substrate, wherein the light-emitting substrate includes the first electrode; and an encapsulation layer group arranged on a side of the light-emitting substrate away from the base substrate, wherein the touch layer group is arranged on a side of the encapsulation layer group away from the base substrate.

In some embodiments of the present disclosure, the connection conductor layer is provided as at least two layers, and the noise reduction layer is arranged in the same layer and using the same material as the connection conductor layer closest to the first electrode.

In some embodiments of the present disclosure, the shielding layer is arranged between film layers of the encapsulation layer group, or the shielding layer is arranged between the encapsulation layer group and the touch layer group, and a width of a first metal wire of the shielding layer decreases as a distance between the shielding layer and the light-emitting substrate increases.

In some embodiments of the present disclosure, the encapsulation layer group includes: a first inorganic layer arranged on a side of the light-emitting substrate away from the base substrate; an organic layer arranged on a side of the first inorganic layer away from the base substrate; and a second inorganic layer arranged on a side of the organic layer away from the base substrate; and wherein the shielding layer is arranged between the first inorganic layer and the organic layer, or the shielding layer is arranged between the organic layer and the second inorganic layer.

In some embodiments of the present disclosure, the light-emitting substrate includes: a second electrode arranged on a side of the driving backplane away from the base substrate; a pixel definition layer arranged on a side of the second electrode away from the base substrate, wherein an opening part is arranged in the pixel definition layer; and a light-emitting layer group arranged on a side of the pixel definition layer away from the base substrate, wherein at least a portion of the light-emitting layer group is arranged within the opening part to form subpixels, and the first electrode is arranged on a side of the light-emitting layer group away from the base substrate.

In some embodiments of the present disclosure, the touch connection wire extends to a binding area and forms a touch binding pin in the binding area, and the shielding connection wire extends to the binding area and forms a shielding binding pin in the binding area, and wherein the display panel further includes: a data line extending to the binding area and forming a data binding pin in the binding area; and a first power connection line extending to the binding area and forming a first power binding pin in the binding area; wherein at least one layer of the touch binding pin, the shielding binding pin, the data binding pin, and the first power binding pin are arranged in the same layer and using the same material.

According to another aspect of the present disclosure, a display panel is provided, including: a base substrate; a driving backplane arranged on a side of the base substrate; a light-emitting substrate arranged on a side of the driving backplane away from the base substrate, wherein the light-emitting substrate includes a second electrode, a light-emitting layer group, and a first electrode arranged in stacked manner in sequence; a touch layer group arranged on a side of the light-emitting substrate away from the base substrate, wherein the touch layer group includes a touch body part and a touch connection wire, and the touch connection wire is connected to the touch body part; a shielding layer arranged between the first electrode and the touch layer group, wherein the shielding layer is configured to enable a direct current (DC) signal to be inputted; and a noise reduction layer, wherein an orthographic projection of the noise reduction layer on the base substrate is located on a side of an orthographic projection of the shielding layer on the base substrate away from a display area, and the noise reduction layer is configured to enable an alternating current (AC) signal to be inputted.

In some embodiments of the present disclosure, both the orthographic projection of the shielding layer on the base substrate and the orthographic projection of the noise reduction layer on the base substrate are located within an orthographic projection of the first electrode on the base substrate.

In some embodiments of the present disclosure, the shielding layer and the noise reduction layer are arranged in the same layer and using the same material.

In some embodiments of the present disclosure, the display panel further includes: a signal generator, wherein the signal generator is connected to the shielding layer, and is configured to provide a constant voltage to the shielding layer, and the signal generator is connected to the noise reduction layer, and is configured to provide a noise reduction signal opposite to a jumping direction of a data signal to the noise reduction layer.

According to another aspect of the present disclosure, a display device is provided, including a display panel as described in any of the above.

In some embodiments of the present disclosure, the display device further includes: an active pen configured to generate a touch signal by cooperating with the touch layer group.

It should be understood that the general description in the above and the detailed description in the following are only illustrative and explanatory, and do not limit the present disclosure.

BRIEF DESCRIPTION OF THE DRAWINGS

The drawings, which are incorporated in and constitute a part of this specification, illustrate embodiments consistent with the present disclosure and serve together with the specification to explain principles of the present disclosure. It is apparent that the drawings in the following description are only some embodiments of the present disclosure, and for those of ordinary skill in the art, other drawings can also be obtained from these drawings without creative efforts.

EXPLANATIONS OF REFERENCE NUMERALS

Figure 1:
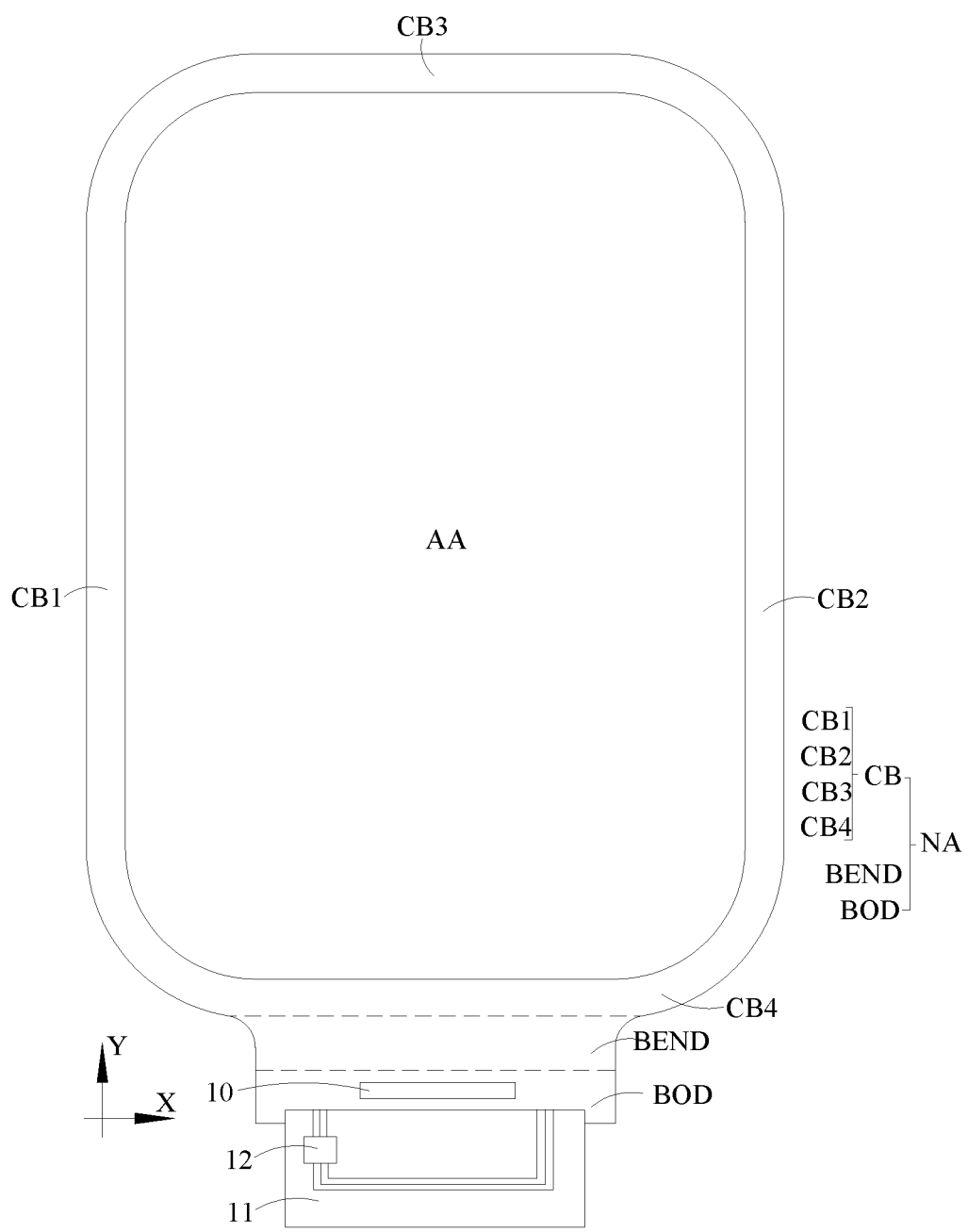
FIG. 1 is a schematic structural diagram of an area division of a display panel according to some embodiments of the present disclosure.

1. Base substrate;
2. Driving backplane; 21. Shading layer; 22. Buffer layer; 231. Channel part; 232. Source; 233. Drain; 24. Gate insulation layer; 25. Gate; 26. Interlayer dielectric layer; 27. First connection conductor layer; 271. Source connection line; 272. Drain connection line; 273. Binding pin; 28. Passivation layer; 29. Second connection conductor layer;
3. Light-emitting substrate; 31. First electrode; 32. Pixel definition layer; 33. Light-emitting layer group; 34. Second electrode; 35. Subpixel;
4. Encapsulation layer group; 41. First inorganic layer; 42. Organic layer; 43. Second inorganic layer;
5. Touch layer group; 51. Barrier layer; 52. First touch layer; 53. Touch insulation layer; 54. Second touch layer; 55. Protection layer;
61. Touch body part; 611. First touch unit; 6111. First touch electrode; 6112. First connection part; 612. Second touch unit; 6121. Second touch electrode; 6122. Second connection part; 613. Second metal wire; 62.

Touch connection wire; 621. First touch connection wire; 622. Second touch connection wire; 623. Touch binding pin;

7. Shielding layer; 71. Shielding body part; 711. First metal wire; 72. Shielding connection wire; 721. First connection wire; 722. Second connection wire; 723. Third connection wire; 724. Fourth connection wire; 725. Shielding binding pin; 73. Shielding connection part;

8. Polarizer; 9. Cover plate; 10. Display driver chip; 11. Flexible printed circuit board; 12. Touch driver chip; 13. Active pen; 14. First power connection line; 141. First power binding pin;

15. Data line; 151. Data binding pin; 1511. First layer; 1512. Second layer; 1513. Third layer;

16. Noise reduction layer; 100. Display substrate;

C. Capacitor; Cr. Parasitic capacitor; C1. First capacitor; C2. Second capacitor; C3. Third capacitor; C4. Fourth capacitor; C5. Fifth capacitor;

AA. Display area; NA. Non-display area; CB. Side area; CB1. First side area; CB2. Second side area; CB3. Third side area; CB4. Fourth side area; BEND. Bending area; BOD. Binding area; BOD1. First binding area; BOD2. Second binding area;

X. First direction; Y Second direction.

DETAILED DESCRIPTION

Example embodiments will now be described more fully with reference to the drawings. Example embodiments, however, can be embodied in a variety of forms and should not be construed as being limited to embodiments set forth herein. Instead, these embodiments are provided so that the present disclosure will be thorough and complete, and will fully convey concepts of the example embodiments to those skilled in the art. The same reference numerals in the drawings represent the same or similar structures, and thus their detailed descriptions will be omitted. In addition, the drawings are only illustrative and are not necessarily drawn to scale.

Although relative terms such as "up" and "down" are used in this specification to describe the relative relationship between one illustrative component and another illustrative component, these terms are only used for convenience in this specification, for example, according to an example direction described in the drawings. It can be understood that if the illustrative device is flipped so that it is upside down, the component described as "up" will become the component described as "down". When a certain structure is "on" other structures, it may mean that a structure is formed as a whole on the other structures, or a structure is "directly" arranged on the other structures, or a structure is "indirectly" arranged on the other structures through another structure.

Terms "one", "a", "the", "said", and "at least one" are used to indicate the existence of one or more elements/components/etc. Terms "include" and "has" are used to indicate open inclusion and refer to the existence of additional elements/components/etc. in addition to the listed ones. Terms "first", "second", and "third" are only used as reference numerals and are not intended to limit the quantity of objects.

In the present disclosure, unless otherwise specified and limited, the term "connection" should be understood broadly. For example, "connection" can be a fixed connection, a detachable connection, or integrated as a whole, which can be directly connected or indirectly connected through intermediate media. "And/or" is simply described an association relationship between associated objects, indicating that there can be three types of relationships. For example, A and/or B can indicate the existence of A alone, the simultaneous existence of A and B, and the existence of B alone. In addition, a character "/" herein generally indicates an "or" relationship between the associated objects.

Embodiments of the present disclosure provide a display panel, as shown in FIGS. 1 to 25. The display panel can include a display substrate 100, a touch layer group 5, and a shielding layer 7. The display substrate 100 can include a first electrode 31. The touch layer group 5 is arranged on a light output side of the display substrate 100. The touch layer group 5 includes a touch body part 61 and a touch connection wire 62. The touch connection wire 62 is connected to the touch body part 61. The shielding layer 7 is arranged between the first electrode 31 and the touch layer group 5. The shielding layer 7 includes a shielding body part 71 and a shielding connection wire 72. The shielding connection wire 72 is connected to the shielding body part 71. A width of the shielding connection wire 72 is greater than a width of the touch connection wire 62.

It should be noted that in this specification, a first direction X intersects with a second direction Y For example, the first direction X can be perpendicular to the second direction Y, and both the first direction X and the second direction Y are parallel to a surface of the display substrate 100 close to the touch layer group 5.

As shown in FIG. 1, the display panel can include a display area AA that displays images and a non-display area NA that does not display images. A touch function can be achieved in the display area AA. The non-display area NA can include a side area CB, which can be arranged around the display area AA. The display panel can further include a bending area BEND for bending and a binding area BOD for binding. The bending area BEND is connected to the side area CB, and the binding area BOD is connected to the bending area BEND.

The side area CB can include a first side area CB1, a second side area CB2, a third side area CB3, and a fourth side area CB4. The first side area CB1 and the second side area CB2 are arranged on two opposite sides of the display area AA along the first direction X. The third side area CB3 and the fourth side area CB4 are arranged on two opposite sides of the display area AA along the second direction Y The binding area BOD is provided on a side of the fourth side area CB4 away from the display area AA. Specifically, the bending area BEND is connected to the fourth side area CB4, and the binding area BOD is connected to the bending area BEND. That is, the bending area BEND is connected between the binding area BOD and the fourth side area CB4.

Figure 2:
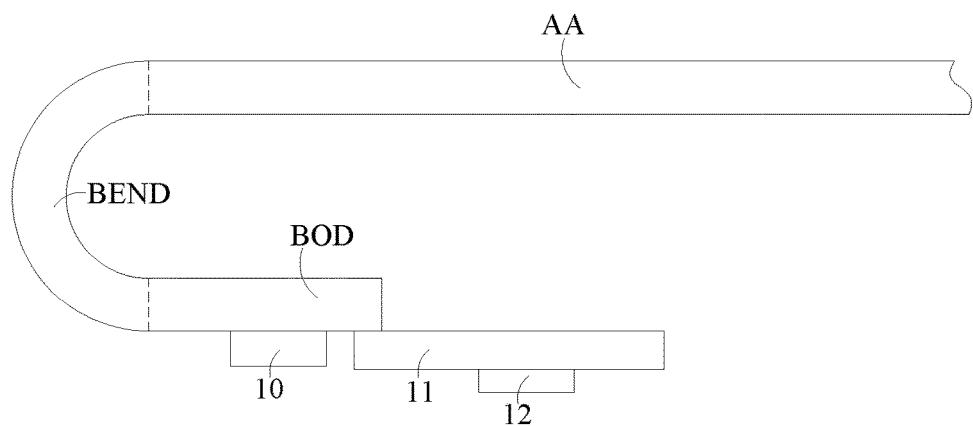
FIG. 2 is a schematic structural diagram of the display panel in FIG. 1 after being bent.

As shown in FIG. 2, the display panel can be bent in the bending area BEND, so that the binding area BOD is bent towards a rear side of the display area AA that is away from a display surface.

As shown in FIGS. 1, 4, 6, and 7, a binding pin 273 is arranged in the binding area BOD, and an external device can be installed (or attached) onto the binding pin 273. The external device can include a display driver chip 10, a touch driver chip 12, a flexible printed circuit board 11, or a rigid printed circuit board, and so on. In addition, Chip On Flex or Chip On Film (COF), a connector, etc. can also be installed onto binding pin 273 as the external device. One or more external devices can be installed in the binding area BOD. The display driver chip 10 can be arranged in the binding area BOD of the display panel, and the printed circuit board can be attached to an end of the binding area BOD. In this case, the display panel can include a binding pin connected to the display driver chip 10 and a binding pin connected to the printed circuit board. In some embodiments, the display driver chip 10 can be installed on the COF, and the COF can be attached to the binding area BOD of the display panel.

As shown in FIG. 1, the display driver chip 10 can be installed on a surface of the display panel that is the same as the display surface. The touch driver chip 12 can be installed on a surface of the flexible printed circuit board 11 that is the same as the display surface. As shown in FIG. 2, when the bending area BEND is bent in reverse, the display driver chip 10 and the touch driver chip 12 are made to be located on a side of the display panel that is away from the display surface. The touch driver chip 12 can be attached to the flexible printed circuit board 11 through anisotropic conductive adhesive. Alternatively, the touch driver chip 12 can be attached to the flexible printed circuit board 11 through ultrasonic bonding.

The touch driver chip 12 can include an integrated circuit that drives the touch layer group 5. The touch driver chip 12 can also include an integrated circuit that receives touch signals. In some embodiments, the integrated circuit can be a touch driving integrated circuit that generates and provides touch driving signals, and a touch sensing integrated circuit that receives touch signals, but the present disclosure is not limited to this. The touch driver chip 12 is connected to the binding pin 273 of the display panel, so as to provide touch driving signals to the binding pin 273 and receive touch sensing signals fed back from the touch layer group 5.

Figure 3:
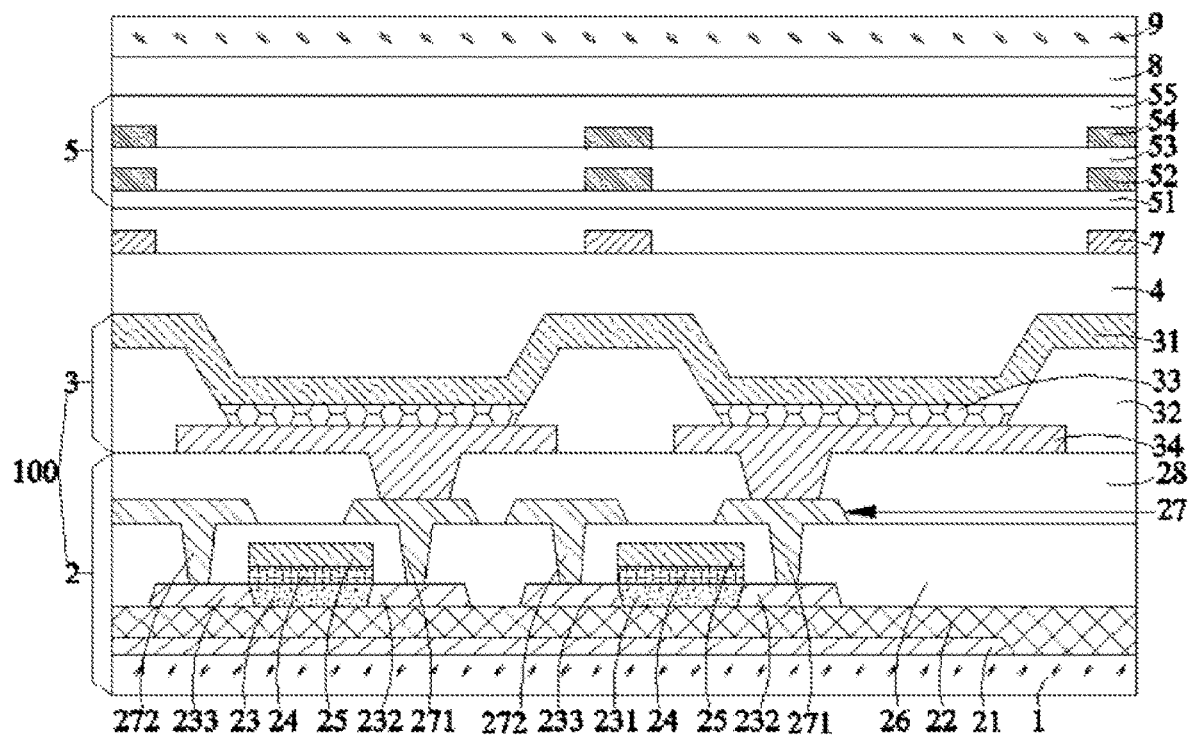
FIG. 3 is a schematic cross-sectional view of a structure of an example display area of the display panel in FIG. 1.

As shown in FIG. 3, the display panel can include a display substrate 100. The display substrate 100 can include a base substrate 1, a driving backplane 2, and a light-emitting substrate 3. The driving backplane 2 is arranged on a side of the base substrate 1, and the light-emitting substrate 3 is arranged on a side of the driving backplane 2 away from the base substrate 1. A touch layer group 5 can be provided on a light output side of the display substrate 100. That is, touch layer group 5 can be provided on a side of the light-emitting substrate 3 away from the base substrate 1. A polarizer 8 can be provided on a side of the touch layer group 5 away from the display substrate 100, and a cover plate 9 can be provided on a side of the polarizer 8 away from the display substrate 100.

The display substrate 100 can be an OLED (Organic Light-Emitting Diode) display substrate 100, a QLED (Quantum Dot Light-Emitting Diode) display substrate 100, or the like. The display substrate 100 has a light output side and a non-light output side, with the light output side and the non-light output side being arranged opposite to each other. On the light output side, the display screen can be displayed, and a surface on which the display screen is displayed is the display surface. The OLED display substrate 100 has advantages of self-illumination, high brightness, wide viewing angle, and fast response time, and has the ability to produce R, G, and B full color components, thus being considered as a star product for next-generation displays.

Descriptions will be provided in the following taking the OLED as an example.

As shown in FIG. 3, the driving backplane 2 can include multiple driving circuits arranged in an array, the light-emitting substrate 3 can include multiple light-emitting devices arranged in an array, and the driving circuits can drive the light-emitting devices to emit light.

The display substrate 100 can include a base substrate 1. A material of the base substrate 1 can include inorganic materials, for example, glass, quartz, or metal. The material of the base substrate 1 can also include organic materials. For example, the organic materials can be resin materials such as polyimide, polycarbonate, polyacrylate, polyetherimide, polyethersulfone, polyethylene terephthalate, and polyethylene naphthalate. The base substrate 1 can be formed by multiple material layers. For example, the base substrate 1 can include multiple base layers, and the material of the base layers can be any of the above materials. The base substrate 1 can also be provided as a single layer, which can be any of the above materials.

As shown in FIG. 3, a shading layer 21 can further be provided on a side of the base substrate 1. The light emitted from the base substrate 1 into an active layer will generate photo generated carriers in the active layer, which will have a significant impact on the characteristics of the thin film transistor and thus impact on the display image quality of the display device. The shading layer 21 can shade the light emitted from the base substrate 1, thereby avoiding affecting the characteristics of the thin film transistor and affecting the display image quality of the display device. The shading layer 21 can be omitted, depending on a type of the thin film transistor.

A buffer layer 22 can further be formed on a side of the shading layer 21 away from the base substrate 1. The buffer layer 22 blocks water vapor and impurity ions in the base substrate 1 (especially in organic materials), and adds hydrogen ions to the subsequent active layer. The buffer layer 22 is made of insulating materials, which can isolate the shading layer 21 from the active layer. The buffer layer 22 can include silicon nitride, silicon oxide, or silicon oxynitride. The buffer layer 22 can be omitted, depending on a type or a process condition of the base substrate 1.

An active layer is provided on a side of the buffer layer 22 away from the base substrate 1. The active layer can include a channel part 231 and conductor parts arranged at both ends of the channel part 231. One of the two conductor parts is a source 232 and the other is a drain 233. A gate insulation layer 24 is provided on a side of the active layer away from the base substrate 1. Agate 25 is provided on a side of the gate insulation layer 24, and an interlayer dielectric layer 26 is provided on a side of the gate 25 away from the base substrate 1. Via holes are provided in the interlayer dielectric layer 26, which are connected to the conductor parts. A first connection conductor layer 27 is provided on a side of the interlayer dielectric layer 26 away from the base substrate 1. In the display area AA, the first connection conductor layer 27 can include a source connection line 271 and a drain connection line 272. The source connection line 271 is connected to the source 232 through the via hole in the interlayer dielectric layer 26, and the drain connection line 272 is connected to the drain 233 through the via hole in the interlayer dielectric layer 26. A passivation layer 28 is provided on a side of the first connection conductor layer 27 away from the base substrate 1. A via hole is arranged in the passivation layer 28, which is connected to the source connection line 271. The channel part 231, the gate 25, the source 232, and the drain 233 form the thin film transistor.

In some embodiments of the present disclosure, a planarization layer is provided on a side of the first connection conductor layer 27 away from the base substrate 1, and via holes are also provided in the planarization layer. A second connection conductor layer is provided on a side of the planarization layer away from the base substrate 1. In the display area AA, the second connection conductor layer can include a second source connection line and/or a second drain connection line. The second source connection line and the second drain connection line are correspondingly connected to the source connection line 271 and the drain connection line 272 through via holes in the planarization layer. A third connection conductor layer, a fourth connection conductor layer, etc. can also be arranged according to needs.

It should be noted that the thin film transistor described in this specification is a top gate type thin film transistor. In some embodiments of the present disclosure, the thin film transistor can also be a bottom gate type or a double gate type, and a specific structure of the thin film transistor will not be elaborated herein. Moreover, in the case where thin film transistors with opposite polarities are used, or where a current direction in the circuit changes during operation, the functions of "source 232" and "drain 233" are sometimes interchanged. Therefore, in this specification, the "source 232" and the "drain 233" can be interchanged.

Reference is made to FIG. 3, the light-emitting substrate 3 is provided on a side of the passivation layer 28 away from the base substrate 1. The light-emitting substrate 3 can include a second electrode 34, a pixel definition layer 32, a light-emitting layer group 33, and a first electrode 31.

In some embodiments, the second electrode 34 is arranged on a side of the passivation layer 28 away from the base substrate 1. The second electrode 34 is connected to the source connection line 271 of the driving backplane 2 through a via hole, and the second electrode 34 can be an anode (a pixel electrode).

The pixel definition layer 32 is arranged on a side of the second electrode 34 away from the base substrate 1. An opening part is provided in the pixel definition layer 32. The opening part is connected to the second electrode 34, so that at least a portion of the second electrode 34 is exposed.

The light-emitting layer group 33 is arranged on a side of the pixel definition layer 32 away from the base substrate 1, with at least a portion of the light-emitting layer group 33 being located within the opening part. The first electrode 31 is arranged on a side of the light-emitting layer group 33 away from the base substrate 1, and the first electrode 31 can be a cathode (a common electrode). The light-emitting layer group 33 located within one opening part emits light to form a subpixel 35, so that an orthographic projection of the subpixel 35 on the display substrate 100 is an orthographic projection of the light-emitting layer group 33 located within the opening part on the display substrate 100. The display substrate 100 can include multiple subpixels 35.

The light-emitting layer group 33 can include a hole injection layer, a hole transport layer, a luminescent layer, an electron transport layer, and an electron injection layer arranged in stacked manner in sequence. The hole injection layer is in contact with the second electrode 34, and the electron injection layer is in contact with the first electrode 31. In some embodiments of the present disclosure, the light-emitting layer group 33 can include a hole transport layer, a luminescent layer, and an electron transport layer only. The light-emitting layer group 33 can also have other structures, and the specific structure can be provided according to needs.

An encapsulation layer group 4 is provided on a side of the first electrode 31 away from the base substrate 1. The encapsulation layer group 4 can be provided in multiple layers. The encapsulation layer group 4 can include an organic layer 42 and inorganic layers. In some embodiments, the encapsulation layer group 4 can include a first inorganic layer 41, an organic layer 42 provided on a side of the first inorganic layer 41 away from the base substrate 1, and a second inorganic layer 43 provided on a side of the organic layer 42 away from the base substrate 1. The materials of the first inorganic layer 41, the organic layer 42, and the second inorganic layer 43 will not be repeated here. In some embodiments, the encapsulation layer group 4 can also include more or fewer layers.

In some embodiments, as shown in FIG. 3, a touch layer group 5 is provided on a side of the encapsulation layer group 4 away from the base substrate 1. The touch layer group 5 can include a barrier layer 51, a first touch layer 52, a touch insulation layer 53, a second touch layer 54, and a protection layer 55. The barrier layer 51 is arranged on a side of the encapsulation layer group 4 away from the base substrate 1, and a material of the barrier layer 51 can be SiNx. The first touch layer 52 is arranged on a side of the barrier layer 51 away from the base substrate 1. The first touch layer 52 can be a Ti/Al/Ti three-layer structure, an ITO/Ag/ITO three-layer structure, and so on. The touch insulation layer 53 is arranged on a side of the first touch layer 52 away from the base substrate 1, and a material of the touch insulation layer 53 can be SiNx. The second touch layer 54 is arranged on a side of the touch insulation layer 53 away from the base substrate 1. The second touch layer 54 can be a Ti/Al/Ti structure, an ITO/Ag/ITO three-layer structure, and so on. The protection layer 55 is arranged on a side of the second touch layer 54 away from the base substrate 1, and a material of the protection layer 55 is PI (polyimide). The materials and structures of the film layers mentioned above are only examples, and can be selected and provided according to needs.

Due to a small distance between the display substrate 100 and the touch layer group 5, the noise on a touch signal is relatively high, especially for the touch using an active pen 13. A noise signal received by the touch electrode is even stronger than a driving signal received from the active pen 13. Moreover, the noise intensity at an end of the display panel close to the binding area BOD is different from the noise intensity at an end of the display panel away from the binding area BOD.

Figure 4:
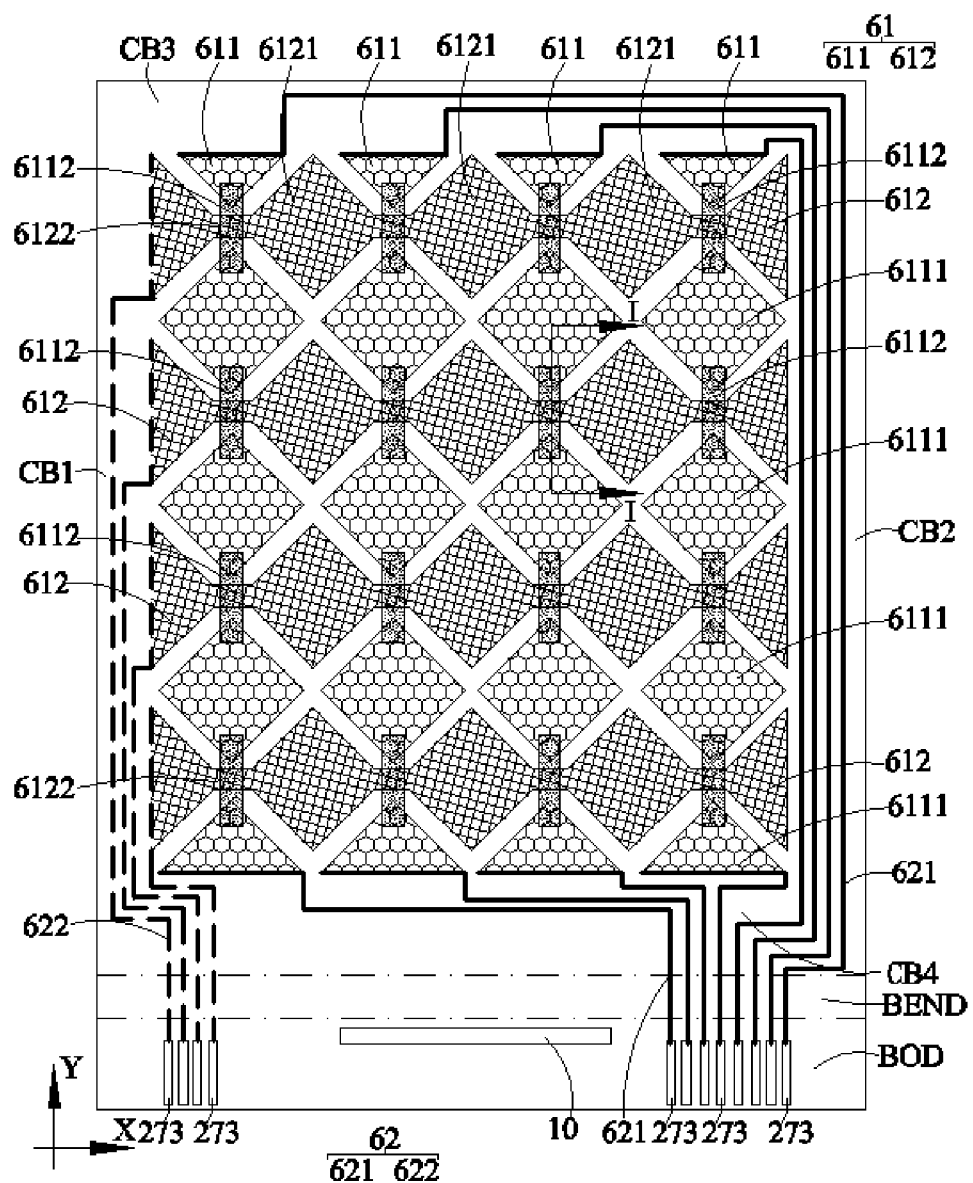
FIG. 4 is a schematic top view of a structure of an example touch layer group of a display panel according to some embodiments of the present disclosure.

As shown in FIGS. 3 and 4, the first touch layer 52 and the second touch layer 54 are provided as conductive grid structures. That is, the first touch layer 52 and the second touch layer 54 are formed by interweaving multiple second metal wires 613, to form multiple second grids. The second grid is a polygon composed of multiple grid lines. One second grid corresponds to one subpixel 35, and an orthographic projection of the subpixel 35 on the base substrate 1 is located within an orthographic projection of the second grid on the base substrate 1, so as to avoid the second grid line blocking the light emitted by the subpixel 35 and ensure the display effect of the display panel.

Figure 5:
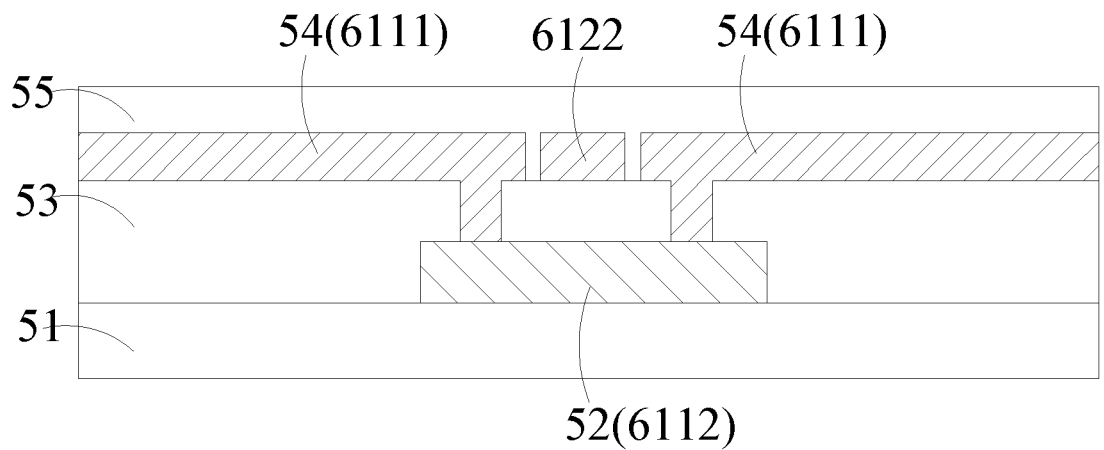
FIG. 5 is a schematic cross-sectional view after being cut along I-I in FIG. 4.

As shown in FIGS. 4 and 5, the conductive grid structures form a touch body part 61. That is, the touch body part can include multiple second metal wires 613, and the multiple second metal wires 613 are interwoven to form multiple second grids. The touch body part 61 can be of a mutual capacitive structure. The touch body part 61 can include multiple first touch units 611 and multiple second touch units 612. The first touch units 611 and the second touch units 612 also include multiple second grids. The first touch units 611 and the second touch units 612 in the metal grid form have advantages such as low resistance, small thickness, and fast response speed.

As shown in FIGS. 4 and 5, the second touch unit 612 has a shape of a row extending along the first direction X, and multiple second touch units 612 are arranged in sequence along the second direction Y The first touch unit 611 has a shape of a column extending along the second direction Y, and multiple first touch units 611 are arranged in sequence along the first direction X. Each first touch unit 611 can include multiple first touch electrodes 6111 and first connection parts 6112 arranged in sequence along the second direction Y The multiple first touch electrodes 6111 are arranged in spaced manner, and adjacent first touch electrodes 6111 are connected to each other through the first connection part 6112. Each second touch unit 612 can include multiple second touch electrodes 6121 and second connection parts 6122 arranged in sequence along the first direction X. The multiple second touch electrodes 6121 are arranged in spaced manner, and adjacent second touch electrodes 6121 are connected to each other through the second connection part 6122.

In some embodiments, as shown in FIGS. 4 and 5, the first touch electrodes 6111, the second touch electrodes 6121, and the second connection parts 6122 are arranged on the same layer, and can be formed through one single patterning process. The second touch electrodes 6121 and the second connection parts 6122 are an integrated structure, while the first connection parts 6112 can be arranged on a bridging layer to form a bridging structure. A touch insulation layer 53 is arranged between the first connection parts 6112 and the second connection parts 6122.

In some embodiments, as shown in FIG. 5, the second touch layer 54 can include the first touch electrodes 6111, the second touch electrodes 6121 (unable to be shown in the drawing), and the second connection parts 6122. The second touch electrodes 6121 and the second connection parts 6122 are connected as a whole in the second touch layer 54. In some embodiments, there are gaps provided between the first touch electrode 6111 and the second touch electrode 6121 as well as between the first touch electrode 6111 and the second connection part 6122, and the gap is achieved through a disconnection part of the second metal wire 613. The first touch layer 52 can include the first connection parts 6112. The first connection part 6112 is connected to two adjacent first touch electrodes 6111 through via holes provided in the touch insulation layer 53, thereby connecting the multiple first touch electrodes 6111 arranged in sequence along the second direction Y together as a whole.

Due to the fact that the driving backplane 2 needs to be connected to electrical signals, and the first touch electrode 6111, the second touch electrode 6121, and the second connection part 6122 also need to be connected to electrical signals, the interference of electrical signals between the driving backplane 2 and the first touch electrode 6111, the second touch electrode 6121, as well as the second connection part 6122 can be reduced, when the first touch electrode 6111, the second touch electrode 6121, and the second connection part 6122 are, compared with the first touch layer 52, farther away from the driving backplane 2, which ensures the display and touch effects of the display panel. In some embodiments of the present disclosure, the first touch layer 52 can also include the first touch electrodes 6111, the second touch electrodes 6121, and the second connection parts 6122, and the second touch layer 54 can also include the first connection parts 6112.

In some embodiments, the first touch electrodes 6111, the first connection parts 6112, and the second touch electrodes 6121 are arranged in the same layer, and can be formed through one single patterning process. The first touch electrodes 6111 and the first connection parts 6112 are an integrated structure. The second connection parts 6122 can be arranged on a bridging layer to form a bridging structure. An insulation layer is provided between the first connection parts 6112 and the second connection parts 6122.

In some embodiments, the second touch layer 54 can include the first touch electrodes 6111, the second touch electrodes 6121, and the first connection parts 6112. The first touch electrodes 6111 and the first connection parts 6112 are connected as a whole in the second touch layer 54. In some embodiments, there are gaps provided between the second touch electrode 6121 and the first touch electrode 6111 as well as between the second touch electrode 6121 and the first connection part 6112, and the gap is achieved through a disconnection part of the metal grid line. The first touch layer 52 can include the second connection parts 6122. The second connection part 6122 is connected to two adjacent second touch electrodes 6121 through fourth via holes provided in the touch insulation layer 53, thereby connecting the multiple second touch electrodes 6121 arranged in sequence along the first direction X together as a whole. In some embodiments of the present disclosure, the first touch layer 52 can also include the first touch electrodes 6111, the second touch electrodes 6121, and the first connection parts 6112, and the second touch layer 54 can also include the second connection parts 6122.

In some embodiments, the first touch electrode 6111 and the second touch electrode 6121 can have rhombic shapes, such as a regular rhombic shape, a transverse rhombic shape, or a longitudinal rhombic shape. In some embodiments, the first touch electrode 6111 and the second touch electrode 6121 can have any one or more shapes of triangle, square, trapezoid, parallelogram, pentagon, hexagon, and other polygons, which is not limited by the present disclosure herein.

As shown in FIG. 4, a touch connection wire 62 is provided in the side area CB. The touch connection wire 62 can include a first touch connection wire 621 and a second touch connection wire 622 (for clarity, different wires in the drawings are distinguished by using different line types).

The first end(s) of one or more of the first touch connection wires 621 is(are) correspondingly connected to one end of the first touch unit 611, and the second end(s) of the one or more of the first touch connection wires 621 is(are) led out to the binding pin 273 and connected to the binding pin 273. The first end(s) of another one or more of the first touch connection wires 621 is(are) correspondingly connected to the other end (opposite to the one end above) of the first touch unit 611, and the second end(s) of the one or more of the first touch connection wires 621 is(are) led out to the binding pin 273 and connected to the binding pin 273.

In some embodiments, in the case where the display panel does not achieve touch by cooperating with the active pen 13 (for example, in the case where the touch can be achieved through fingers), the first touch electrode 6111 can be a driving electrode, and the second touch electrode 6121 can be a sensing electrode. Alternatively, the first touch electrode 6111 can be a sensing electrode, and the second touch electrode 6121 can be a driving electrode. Multiple first touch units 611 and multiple second touch units 612 form an array of M rows of driving electrodes*N columns of sensing electrodes. That is, the array includes M second touch units 612 and N first touch units 611, where M and N are positive integers greater than two.

As shown in FIG. 4, a first end of a second touch connection wire 622 is correspondingly connected to one end of the second touch unit 612, and a second end of the second touch connection wire 622 is led out to the binding pin 273 and connected to the binding pin 273. Such arrangement can also be referred to as 2T1R (the first touch unit 611 is a touch driving unit, and the second touch unit 612 is a touch sensing unit), or 1T2R (the first touch unit 611 is the touch sensing unit, and the second touch unit 612 is the touch driving unit) pattern.

It can be understood that the first touch electrodes 6111 located in the same rank are arranged in sequence along the second direction Y (a length direction of the display area AA). The first touch units 611 in one rank includes a relatively large number of first touch electrodes 6111. The touch signal starts from the first touch electrode 6111 located at a first position of the rank, which is coupled with the first touch connection wire 621, and moves along a direction away from the first touch connection wire 621, to transmit along a rank of first touch electrodes 6111 sequentially. But as the transmission distance increases, the touch signal will gradually decay. In some embodiments, in the case of a large number of first touch electrodes 6111, the first touch electrodes 6111 at two ends in a rank are respectively coupled with the first touch connection wires 621, which can ensure that the touch signal received by the first touch electrode 6111 farthest from the first touch connection wire 621 in the first touch electrodes 6111 in the rank is not attenuated, to ensure that touch signals on the multiple first touch electrodes 6111 in the rank are basically the same and reduce the touch noise.

In some embodiments, the first touch connection wire 621 can also have only one connection pattern, that is, the first touch unit 611 has only one end connected to the first touch connection wire 621, which is referred to as 1T1R pattern.

In some embodiments of the present disclosure, the second touch connection wires 622 can be provided in two portions. The first end(s) of one or more of the second touch connection wires 622 is(are) correspondingly connected to the one end of the second touch unit 612, and the second end(s) of the one or more of the second touch connection wires 622 is(are) led out to the binding pin 273 and connected to the binding pin 273. The first end(s) of another one or more of the second touch connection wires 622 is(are) correspondingly connected to the other end (opposite to the one end above) of the second touch unit 612, and the second end(s) of the one or more of the second touch connection wires 622 is(are) led out to the binding pin 273 and connected to the binding pin 273.

Such arrangement is also referred to as 2T2R pattern, which ensures that among the touch electrodes in a rank coupled to the touch connection wire, the touch signal received by the touch electrode located farther away from the touch connection wire and the touch signal received by the touch electrode located closer to the touch connection wire have little difference, so that the touch accuracy of relatively large touch screens can be ensured.

Figure 6:
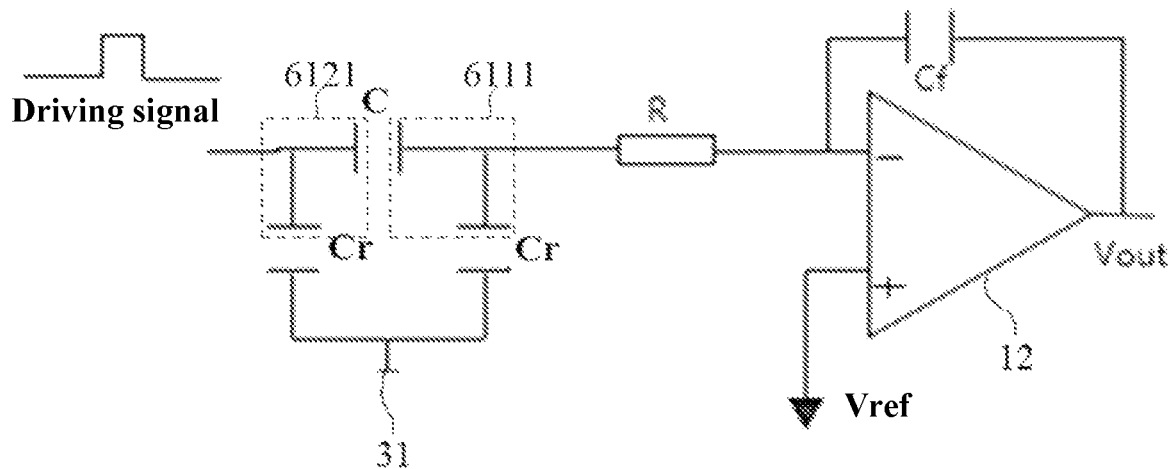
FIG. 6 is a schematic diagram of an example circuit that generates noise in a touch layer group of a display panel according to some embodiments of the present disclosure.

As shown in FIG. 6, the touch principle is as follows: the second touch electrode 6121 and the first touch electrode 6111 can form a capacitor C, and multiple first touch electrodes 6111 and multiple second touch electrodes 6121 can form multiple capacitors C (such as C1, C2, C3, . . . ). Each capacitor C occupies a different position in the touch body part 61. It can also be understood that in the coordinate system composed of the first direction X and the second direction Y, each capacitor C is located at a different point. The touch driver chip 12 sends a touch drive signal (such as a trigger signal) to the first touch connection wire 621, and the touch drive signal is transmitted to the first touch electrodes 6111 through the first touch connection wire 621. At this point, the above-mentioned capacitors C at different positions have initial capacitance values. Due to the fact that the human body itself is a conductor, when a person's finger touches a certain position on the display panel, the capacitance value of the capacitor C at that position will change. Based on the amount of change in the capacitance value, a corresponding touch sensing signal (such as a receiving signal) will be received on the second touch electrode 6121 at that position. The touch sensing signal on the second touch electrode 6121 at that position is transmitted to the touch driver chip 12 through the second touch connection wire 622, and an amplifier inside the touch driver chip 12 amplifies the touch sensing signal. The capacitance values of the capacitors C at untouched positions remain unchanged. Therefore, the touch point can be determined by determining the capacitance values on each capacitor C, and thus achieving the touch function.

In the case where a display screen is displayed on the display panel, the first electrode 31 of the display substrate 100 also has a set voltage, especially when the display screen changes. That is, when values of all data signals jump from current values of the data signals to next values of the data signals, the voltage on the first electrode 31 will also change, for the data line overlaps with the first electrode 31 and a capacitor is formed therebetween. In addition, because a encapsulation layer group 4 is arranged between the first electrode 31 and the touch body part 61, which would lead to a fact that parasitic capacitors Cr are formed between the first electrode 31 and the first touch electrode 6111, as well as between the first electrode 31 and the second touch electrode 6121, change in the voltage on the first electrode 31 will affect the voltage on the first touch electrode 6111 and the voltage on the second touch electrode 6121, resulting in noise and affecting the accuracy of the touch sensing signal.

Figure 7:
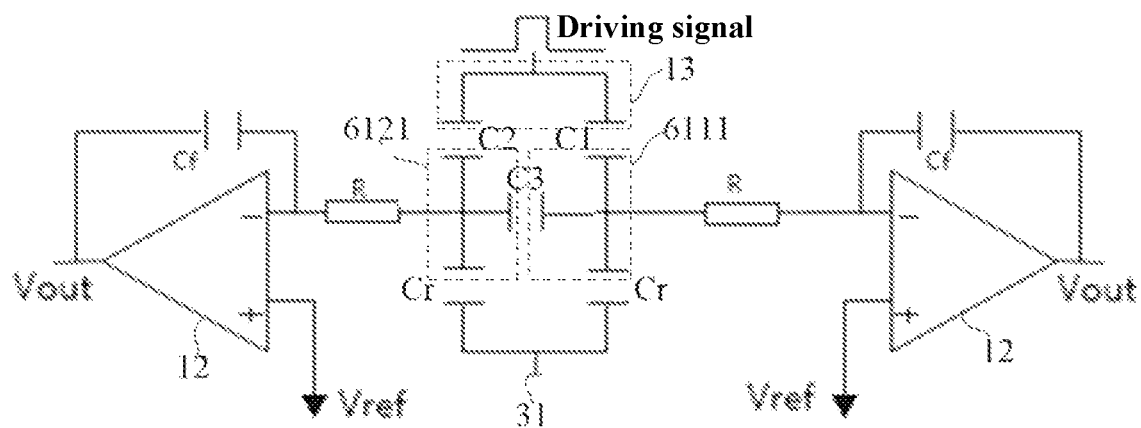
FIG. 7 is a schematic diagram of an example circuit that generates noise in a touch layer group of a display panel according to some embodiments of the present disclosure.

As shown in FIG. 7, in the case where the display panel achieves touch by cooperating with the active pen 13, the specific structure of the touch layer group is the same as that described above, with the difference being that both the first touch electrode 6111 and the second touch electrode 6121 serve as sensing electrodes, and the first touch unit 611 and the second touch unit 612 divide the display area into coordinate grids. Multiple first touch electrodes 6111 and multiple second touch electrodes 6121 occupy different positions in the touch body part 61. It can also be understood that in the coordinate system composed of the first direction X and the second direction Y, each first touch electrode 6111 and each second touch electrode 6121 are located at different points.

The touch principle is as follows: a driving signal is inputted to the active pen 13, instead of the first touch electrode 6111. When the active pen 13 contacts a certain position on the display panel, a first capacitor C1 is formed between the active pen 13 and the first touch electrode 6111, and a second capacitor C2 is formed between the active pen 13 and the second touch electrode 6121. In addition, a third capacitor C3 is also formed between the first touch electrode 6111 and the second touch electrode 6121. The first capacitor C1, the second capacitor C2, and the third capacitor C3 form a capacitive structure. A touch sensing signal of the capacitive structure is transmitted to the touch driver chip 12 respectively through the first touch connection wire 621 and the second touch connection wire 622. The amplifier inside the touch driver chip 12 amplifies the touch sensing signal. No touch sensing signals are outputted at the untouched positions. Therefore, the touch point can be determined by determining from which first touch connection wire 621 and second touch connection wire 622 the touch sensing signal is outputted, and thus achieving the touch function.

In the case where a display screen is displayed on the display panel, the first electrode 31 of the display substrate 100 also has a set voltage, especially when the display screen changes. That is, when values of all data signals jump from current values of the data signals to next values of the data signals, the voltage on the first electrode 31 will also change, for the data line overlaps with the first electrode 31 and a capacitor is formed therebetween. In addition, because a encapsulation layer group 4 is arranged between the first electrode 31 and the touch body part 61, which would lead to a fact that parasitic capacitors Cr are formed between the first electrode 31 and the first touch electrode 6111, as well as between the first electrode 31 and the second touch electrode 6121, change in the voltage on the first electrode 31 will affect the voltage on the first touch electrode 6111 and the voltage on the second touch electrode 6121, resulting in noise and affecting the accuracy of the touch sensing signal. The noise is particularly prominent for the display panel to cooperate with the active pen 13, because the protocol driving frequency of the active pen 13 is a fixed frequency or a fixed frequency band, and if the noise of the display screen has the same frequency as the active pen 13 and the signal strength reaches a certain value, the touch driver chip 12 cannot distinguish whether the signal collected is a touch signal or a noise signal.

Moreover, the jumping of the data signal refers to the simultaneous jumping of all data signals in an entire row. If all data signals in the row jump from the highest (or lowest) gray level to the lowest (or highest) gray level, it is equivalent that all jumping of the data signals affect the jumping of the first electrode 31, and the jumping of the first electrode 31 reaches the maximum at this point. When the jumping of the data signals includes both up jumping and down jumping, the impacts on the first electrode 31 include both positive impacts and negative impacts, and a portion of the impacts will be offset, making the jumping of the first electrode 31 less significant than the overall jumping mentioned above.

In addition, it should be noted that a frequency used for collecting the touch signal is much lower than a frequency at which the jumping of the data signal on the display substrate 100 occurs. The voltage on the first electrode 31 needs a certain time period for recovery, but when the jump amount of the voltage on the first electrode 31 is large, exactly at then the touch signal being collected, it is easy to lead to errors, which results in the touch failure.

Reference continues to be made to FIG. 3, in some embodiments, a shielding layer 7 is arranged between the first electrode 31 and the touch layer group 5. The shielding layer 7 can include a shielding body part 71 and a shielding connection wire 72. The shielding body part 71 is arranged in the display area AA. One end of the shielding connection wire 72 is connected to the shielding body part 71, and the other end of the shielding connection wire 72 is connected to the binding pin 273 in the binding area BOD. A width of the shield connection wire 72 is greater than a width of the touch connection wire 62.

Figure 24:
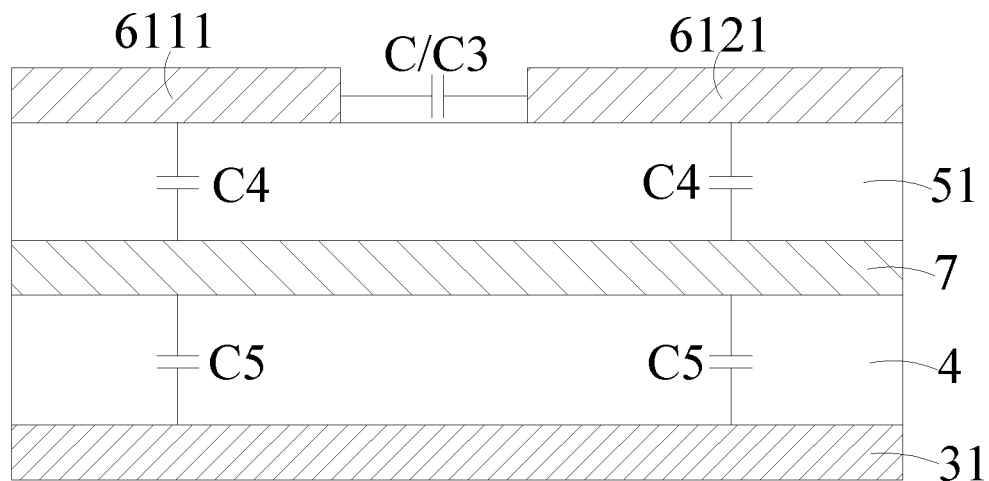
FIG. 24 is a schematic structural diagram of a capacitor formed between a shielding layer and a first electrode, a first touch electrode, and a second touch electrode.

On the one hand, the shielding layer 7 can isolate the first electrode 31 from the touch layer group 5, to reduce the impact of the change in the voltage of the first electrode 31 on the touch signal of the touch layer group 5, thereby reducing the noise signal. As shown in FIG. 24, fourth capacitors C4 are formed between the shielding layer 7 and the first touch electrode 6111, as well as between the shielding layer 7 and the second touch electrode 6121, and a fifth capacitor C5 is formed between the shielding layer 7 and the first electrode 31. As long as the signal on the shielding layer 7 remains unchanged, the capacitance values of the fourth capacitors C4 will not change and will not generate noise signals on the first touch electrode 6111 and the second touch electrode 6121. On the other hand, the width of the shielding connection wire 72 is greater than the width of the touch connection wire 62, which means that the width of the shielding connection wire 72 is wider, allowing the resistance of the shielding layer 7 to be smaller, and ensuring good shielding effect of the shielding layer 7.

Figure 8:
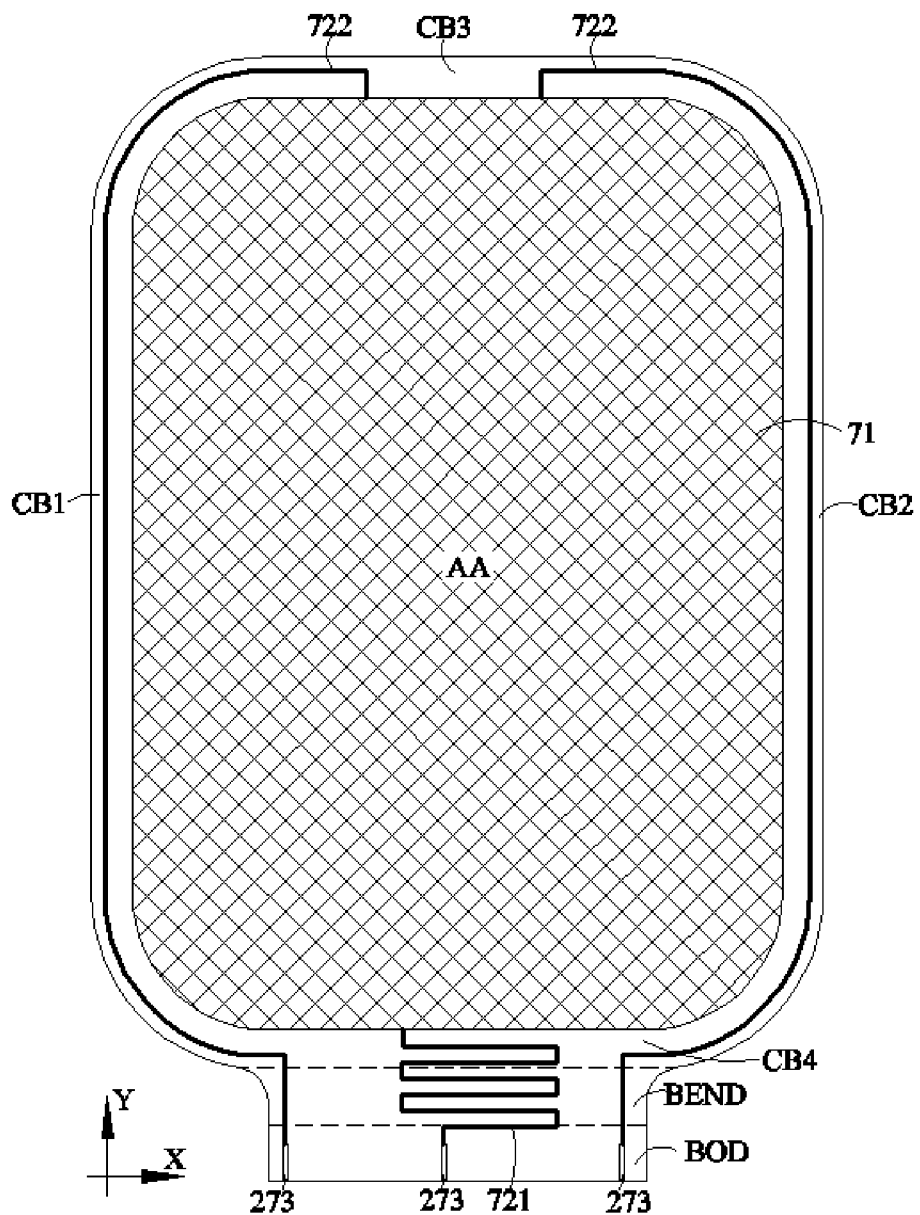
FIG. 8 is a schematic top view of a structure of an example shielding layer of a display panel according to some embodiments of the present disclosure.
Figure 9:
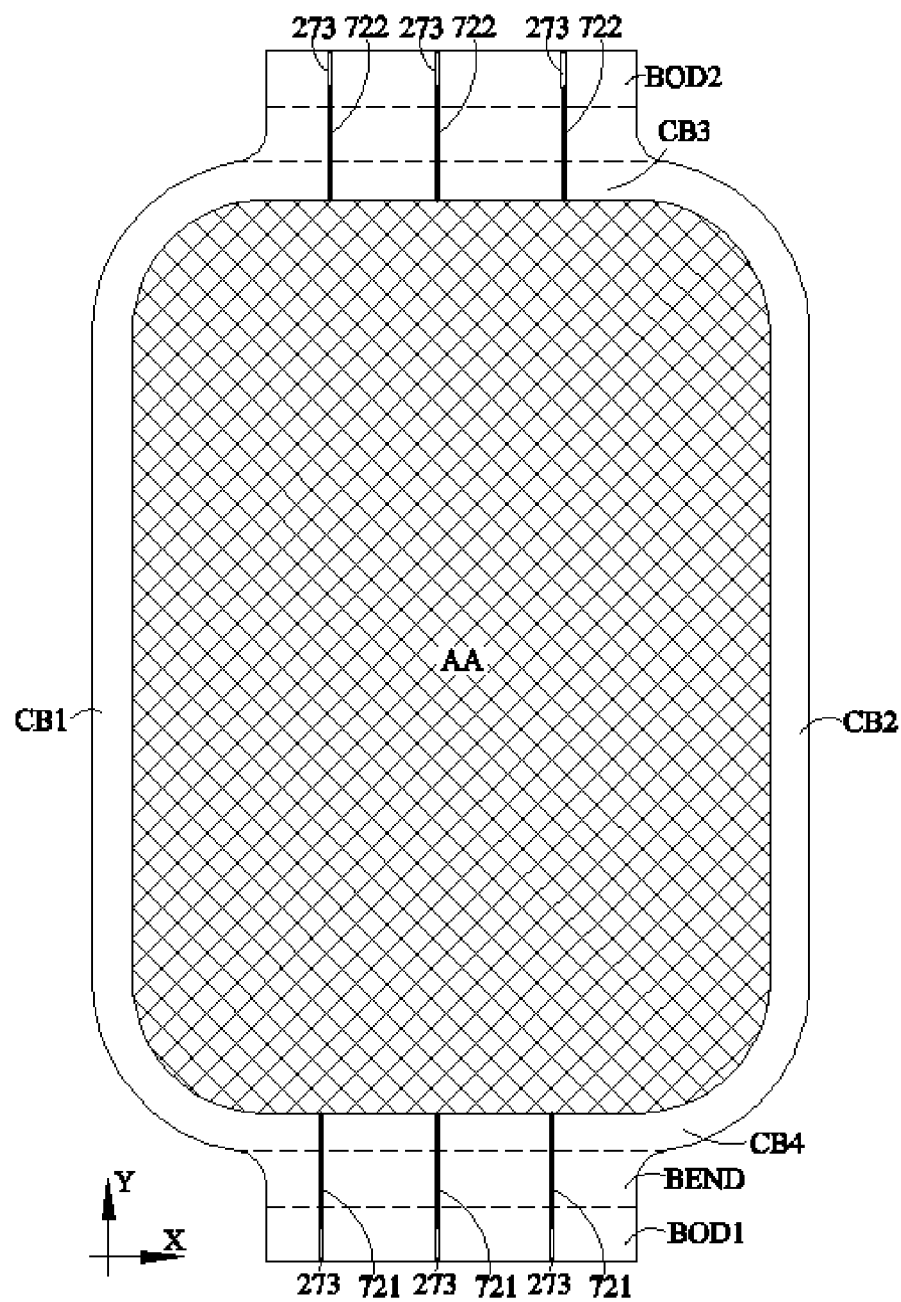
FIG. 9 is a schematic top view of a structure of an example shielding layer of a display panel according to some embodiments of the present disclosure.

In some embodiments, as shown in FIGS. 8 and 9, the shielding body part 71 is provided as a metal grid structure. That is, the shielding body part 71 can include multiple first metal wires 711, the multiple first metal wires 711 are interwoven to form multiple first grids, and one first grid corresponds to one subpixel 35. The subpixels 35 of the display substrate 100 are located within orthographic projections of the first grids on the display substrate 100, so as to avoid the first grid line blocking the light emitted by the subpixel 35 and to ensure the display effect of the display panel.

Figure 10:
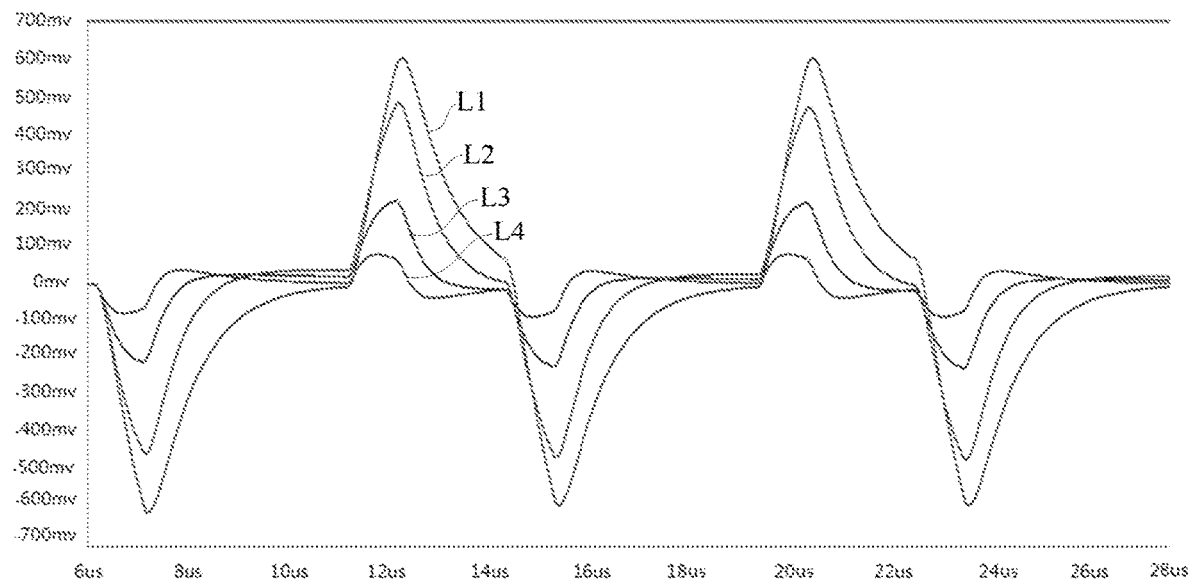
FIG. 10 is a schematic diagram of noise simulations in various scenarios.

As shown in FIG. 10, the horizontal axis represents the time in microseconds (μ, s), and the vertical axis represents the noise intensity in millivolts (mv). In the drawing, L1 represents the noise curve generated by the first electrode, L2 represents the noise curve on the touch layer group 5 without the shielding layer 7, L3 represents the noise curve on the touch layer group 5 where the shielding layer 7 adopts ITO (indium tin oxide), and L4 represents the noise curve on the touch layer group 5 where the shielding layer 7 adopts metal. It can be seen from the drawing that the resistance of ITO shielding layer 7 is greater than the resistance of metal shielding layer 7. The noise on the touch layer group 5 when the ITO shielding layer 7 is used is greater than the noise on the touch layer group 5 when the metal shielding layer 7 is used. Therefore, the smaller the resistance of the shielding layer 7 is, the lower the noise on the touch layer group 5 is, and the better the shielding effect is.

Figure 14:
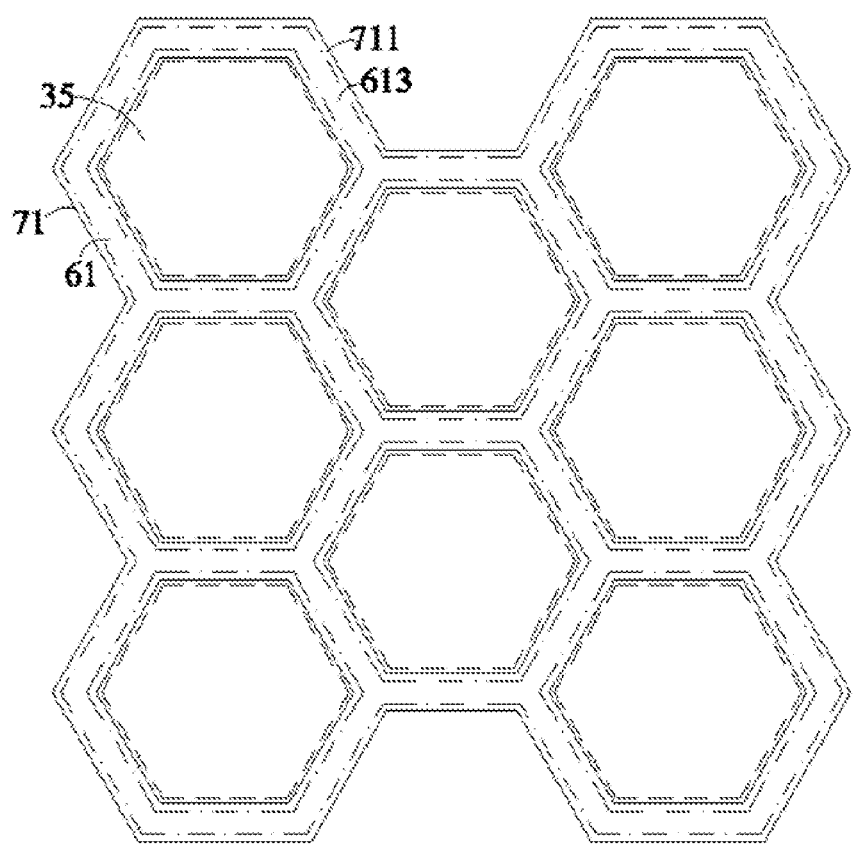
FIG. 14 is a schematic top view of a touch body part, a shielding body part, and a subpixel.

As shown in FIG. 14, the dashed line in the drawing represents an edge of the subpixel 35, the solid line represents an edge of the shielding body part 71, and the dotted line represents an edge of the touch body part 61. A width of the first metal wire 711 of the shielding body part 71 is greater than or equal to a width of the second metal wire 613 of the touch body part 61. In some embodiments, an orthographic projection of the second metal wire 613 of the touch body part 61 on the base substrate 1 is located within an orthographic projection of the first metal wire 711 of the shielding body part 71 on the base substrate 1. That is, the orthographic projection of the second metal wire 613 on the display substrate 100 is located within the orthographic projection of the first metal wire 711 on the display substrate 100. As a result, the resistance of the shielding body part 71 can be less than or equal to the resistance of the touch body part 61, which further ensures the shielding effect of the shielding body part 71.

Figure 11:
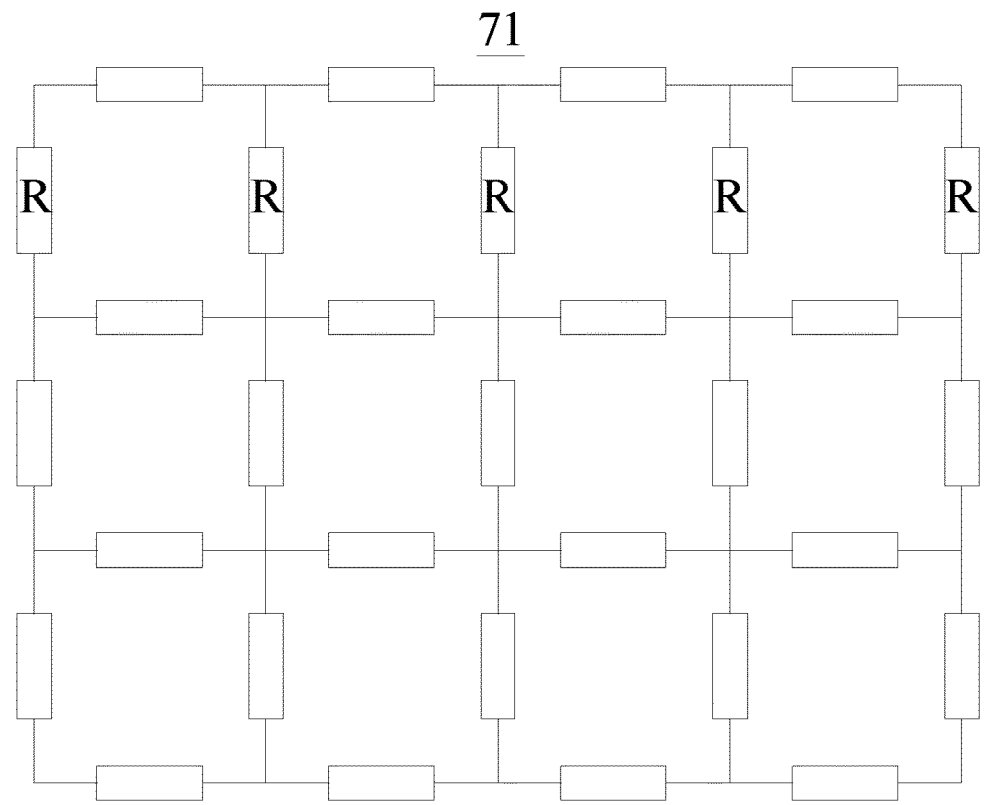
FIG. 11 is a schematic structural diagram of an equivalent circuit of a shielding body part.

In some embodiments, as shown in FIG. 11, there are no disconnection parts in the wires provided within the shielding body part 71, so that the shielding body part 71 can form multiple resistors R connected in series and in parallel, which further reduces the resistance of the shielding body part 71 and ensures the shielding effect of the shielding body part 71.

Since the shielding body part 71 is arranged in the display area AA, even if the width of the first metal wire 711 is widened, the widened width will be limited in order to avoid the impact on the aperture ratio of the subpixel 35. Therefore, the width of the shielding connection wire 72 can be provided to be greater than the width of the first metal wire 711, so as to further reduce the resistance of the shielding layer 7 and ensure the good shielding effect of the shielding layer 7.

In some embodiments, the shielding connection wire 72 is grounded or connected to a constant voltage terminal, i.e. a grounding voltage or a constant voltage serves as a shielding signal. In some embodiments, the shielding connection wire 72 is grounded or connected to a constant voltage terminal through the binding pin 273, so that the shielding body part 71 is grounded or connected to the constant voltage terminal, and the shielding body part 71 can maintain a zero voltage or a constant voltage. As a result, even if the voltage on the first electrode 31 changes, the voltage on the shielding body part 71 will not be affected, and thus not affecting the voltage on the touch body part 61, so as to avoid noise generating on the touch body part 61 when the voltage on the first electrode 31 changes, which affects the touch effect. The constant voltage can be provided through the touch driver chip 12, that is, the shielding connection wire 72 is connected to the touch driver chip 12 through the binding pin 273.

In some embodiments of the present disclosure, a shielding signal opposite to the noise signal can also be provided to the shielding layer 7 by using a signal generator. Since a jumping direction of a cathode signal on the first electrode 31 is the same as a jumping direction of a data signal on the data line, and since the data signal is convenient for measurement, the cathode signal is not convenient for measurement, and the noise signal is generated due to the jumping of the cathode signal on the first electrode 31, a shielding signal opposite to the data signal of the display substrate 100 is provided to the shielding layer 7 through a signal generator, and an amplitude of the shielding signal is smaller than an amplitude of the data signal. The amplitude of the shielding signal is 20%-40% of the amplitude of the data signal. For example, the amplitude of the data signal is 5 v, and the amplitude of the shielding signal is 1 v-2 v, which can be 1.2 v, 1.5 v, 1.7 v, etc. When the jumping of the cathode signal on the first electrode 31 occurs, the jumping of the shielding signal on the shielding layer 7 also occurs, and the jumping directions are opposite, with basically the same amplitudes, so that the voltage of the shielding layer 7 actually does not change, and thus not affecting the signal of the touch layer. The signal generator can be the touch driver chip 12. The shielding connection wire 72 is connected to the touch driver chip 12 through the binding pin 273. The touch driver chip 12 provides the shielding signal opposite to the data signal of the display substrate 100 to the shielding layer 7, further improving the shielding effect.

It can be understood that a shielding signal is transmitted from one end of the shielding body part 71 coupled to the shielding connection wire 72 along a direction away from the shielding connection wire 72, and transmitted sequentially along the shielding body part 71. As the transmission distance increases, the shielding signal will gradually decay. In some embodiments, in the case where the shielding body part 71 is relatively long, both ends of the shielding body part 71 are respectively coupled with the shielding connection wire 72, so as to ensure that a portion of the shielding body part 71 which is farthest away from the shielding connection wire 72 can receive the shielding signal. That is, the shielding signals of each portion of the shielding body part 71 are basically the same, so as to ensure that the shielding effect of each portion of the shielding body part 71 is consistent and ensure the shielding effect.

If the resistances of the shielding connection wires 72 connected to two ends of the shielding body part 71 are different, different shielding signals will also be inputted to the two ends of the shielding body part 71, resulting in inconsistent shielding effects, which would make an impact on the shielding effect.

Moreover, if the resistances of the shielding connection wires 72 connected to the same end of the shielding body part 71 are different, different shielding signals will also be inputted to the same end of the shielding body part 71, resulting in inconsistent shielding effects, which would make an impact on the shielding effect.

In order to solve the above problem, in the case where the shielding connection wires 72 are provided as at least two, the resistances of the at least two shielding connection wires 72 are the same, so as to avoid the noise caused by different resistances of the shielding connection wires 72. That is, different shielding signals inputted to the two ends of the shielding body part 71 due to different resistances of the shielding connection wires 72 can be avoided, and inconsistent shielding effects can be avoided, thereby ensuring the shielding effect.

It should be noted that "the same resistances" does not mean that the resistances are exactly the same, but a certain error exists between the resistances. An error range varies depending on the equipment and the preparation process. Therefore, the resistances are considered to be the same within the error range of the equipment and the preparation process. For example, if the resistance of one shielding connection wire 72 is 95%-105% of the resistance of another shielding connection wire 72, the resistances of these two shielding connection wires 72 are considered to be the same.

In some embodiments, as shown in FIG. 8, the binding area BOD can be provided as one area, and the binding area BOD is arranged on one side of the display area AA along the second direction Y. At least two binding pins 273 are arranged in the binding area BOD. The shielding connection wire 72 can include a first connection wire 721 and a second connection wire 722. One end of the first connection wire 721 is connected to the binding pin 273, and the other end of the first connection wire 721 is connected to an end of the shielding body part 71 away from the binding area BOD. One end of the second connection wire 722 is connected to the binding pin 273, and the other end of the second connection wire 722 is connected to an end of the shielding body part 71 close to the binding area BOD. The resistance of the second connection wire 722 is equal to the resistance of the first connection wire 721.

Since the second connection wire 722 is longer in length, the first connection wire 721 is shorter in length, and the length of the second connection wire 722 cannot be shorten, the resistance of the first connection wire 721 can be increased by increasing the length of the first connection wire 721, so that the resistance of the second connection wire 722 is equal to the resistance of the first connection wire 721. In some embodiments, the resistance of the second connection wire 722 can also be reduced by increasing the width or thickness of the second connection wire 722, so that the resistance of the second connection wire 722 is equal to the resistance of the first connection wire 721. In some embodiments, the thickness of the second connection wire 722 can be increased by thickening a single layer or adopting a two-layer arrangement, that is, the second connection wire 722 can be provided as a two-layer structure, one layer of which can be arranged in the same layer and using the same material as the first electrode 31. In some embodiments, one layer of two-layer structure can also be arranged in the same layer and using the same material as the source connection wire 271, the second electrode 34, the first touch layer 52, or the second touch layer 54.

In some embodiments, as shown in FIG. 9, two binding areas BOD can be arranged. The two binding areas can be a first binding area BOD1 and a second binding area BOD2.

The first binding area BOD1 and the second binding area BOD2 are arranged on opposite sides of the display region AA along the second direction Y The shielding connection wire 72 can include a first connection wire 721 and a second connection wire 722. One end of the first connection wire 721 is connected to the binding pin 273 in the first binding area BOD1, and the other end of the first connection wire 721 is connected to an end of the shielding body part 71 close to the first binding area BOD1. One end of the second connection wire 722 is connected to the binding pin 273 in the second binding area BOD2, and the other end of the second connection wire 722 is connected to an end of the shielding body part 71 close to the second binding area BOD2.

Since the first connection wire 721 is arranged in the fourth side area CB4 only, without needing to connect the shielding body part 71 with the binding pin 273 by travelling other side areas CBs in bypassed manner, and since the second connection wire 722 is arranged in the third side area CB3 only without needing to connect the shielding body part 71 with the binding pin 273 by travelling other side areas CBs in bypassed manner, the length, width, and thickness of the second connection wire 722 can be provided to be equivalent to the length, width, and thickness of the first connection wire 721, so that the resistance of the second connection wire 722 can be equal to the resistance of the first connection wire 721.

In some embodiments, the length of the first connection wire 721 and the length of the second connection wire 722 in present embodiments are shorter than the length of the first connection wire 721 and the length of the second connection wire 722 in embodiments shown in FIG. 8. Therefore, the resistance of the first connection wire 721 and the resistance of the second connection wire 722 in present embodiments are smaller than the resistance of the first connection wire 721 and the resistance of the second connection wire 722 in embodiments shown in FIG. 8, enabling a better shielding effect of the shielding body part 71.

It should be noted that the first connection wire 721 can be provided as one, two, or more wires, as long as there is space in the side area CB, the first connection wire 721 can be arranged. Similarly, the second connection wire 722 can be provided as one, two, or more wires, as long as there is space in the side area CB, the second connection wire 722 can be arranged.

In some embodiments, the display area AA in FIGS. 8 and 9 has a length along the second direction Y greater than a width along the first direction X of the display area AA. In some embodiments of the present disclosure, when a length of the display area AA along the first direction X is greater than a width of the display area AA along the second direction Y, the binding area BOD can be arranged on a side of the display area AA along the second direction Y, that is, the binding area BOD is arranged on a side of the display area AA along a width direction. In some embodiments, the first binding area BOD1 and the second binding area BOD2 can be arranged on opposite sides of the display area AA along the second direction Y, that is, the first binding area BOD1 and the second binding area BOD2 can be arranged on sides of the display area AA along the width direction. The arrangement structures of the first connection wire 721 and the second connection wire 722 are also as that shown in FIGS. 8 and 9. The specific structures of the first connection wire 721 and the second connection wire 722 have been explained in detail in the above, which will not be repeated here.

Figure 12:
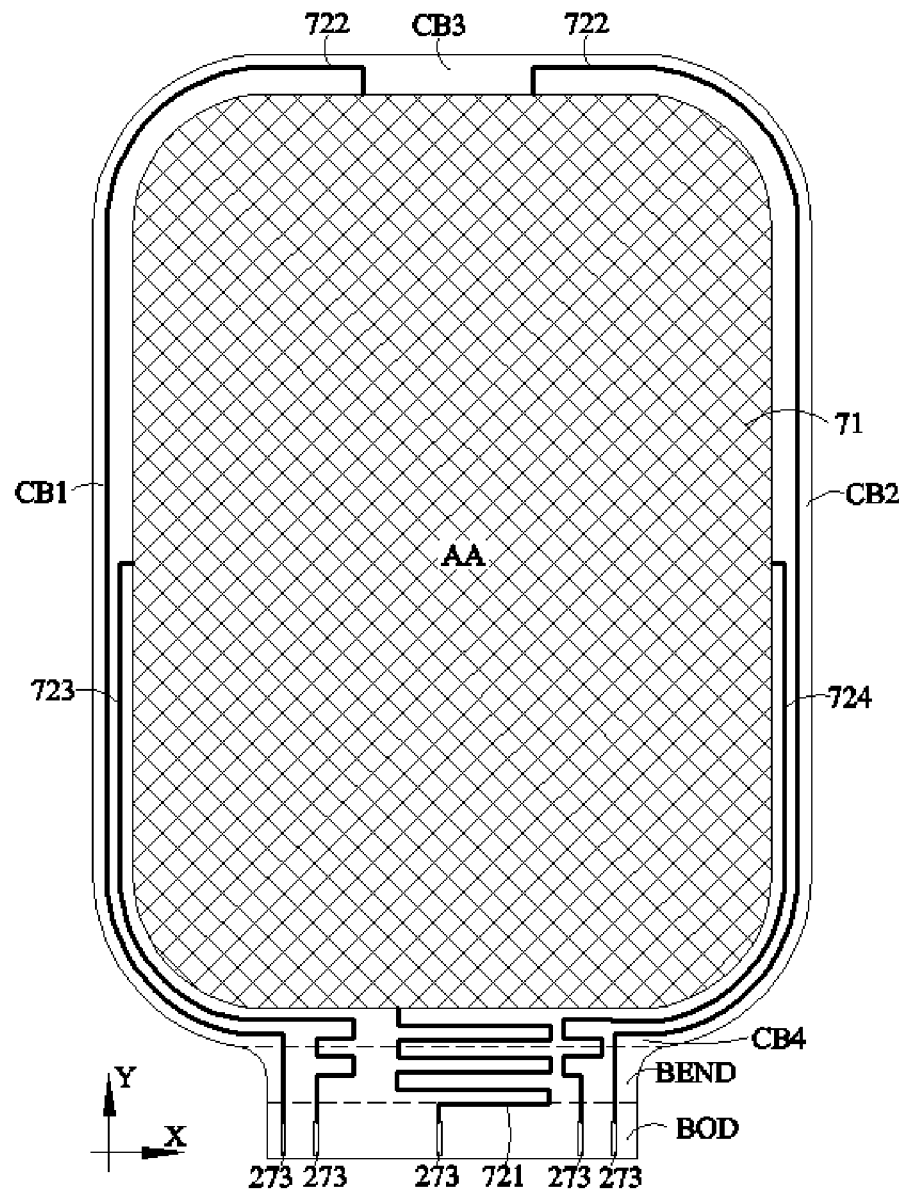
FIG. 12 is a schematic top view of a structure of an example shielding layer of a display panel according to some embodiments of the present disclosure.
Figure 13:
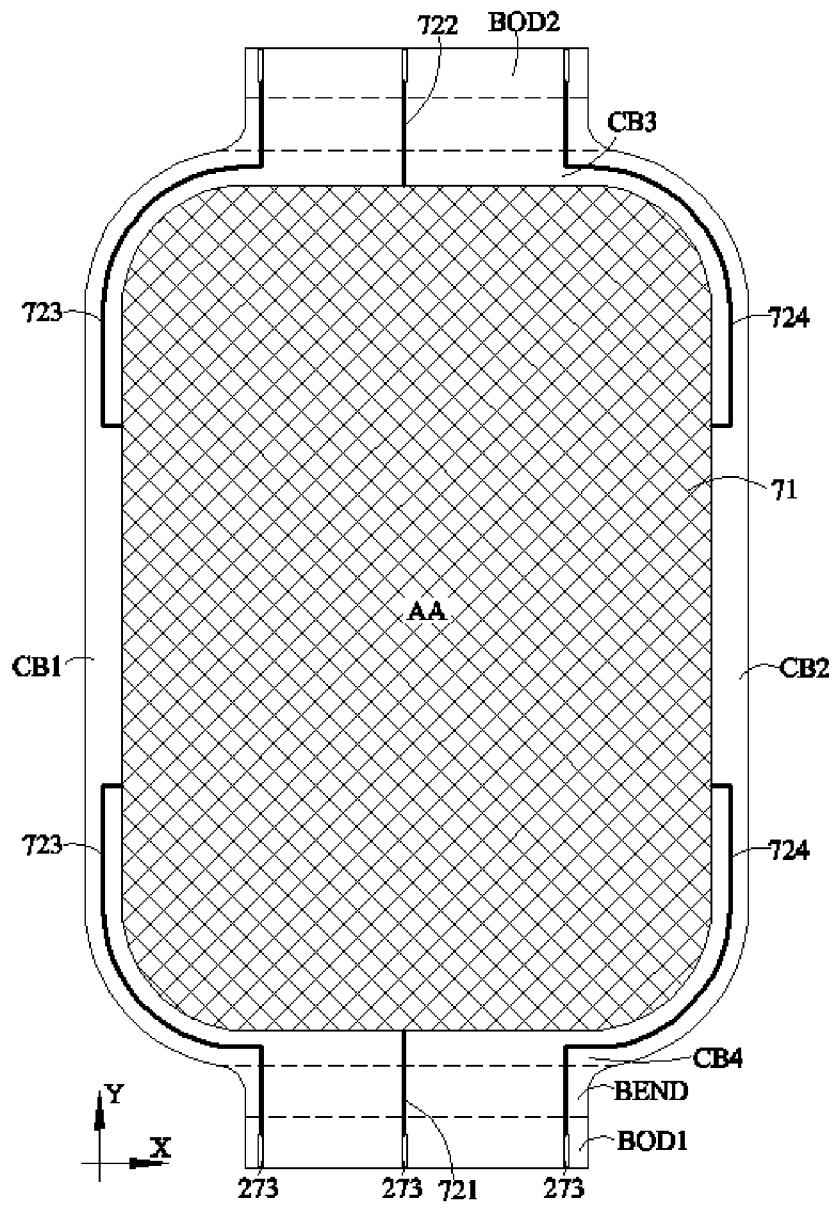
FIG. 13 is a schematic top view of a structure of an example shielding layer of a display panel according to some embodiments of the present disclosure.

In some embodiments, as shown in FIGS. 12 and 13, the shielding connection wire 72 can also include a third connection wire 723 and a fourth connection wire 724. One end of the third connection wire 723 is connected to the binding pin 273, and the other end of the third connection wire 723 is connected to an end of the shielding body part 71 close to the first side area CB1. One end of the fourth connection wire 724 is connected to the binding pin 273, and the other end of the fourth connection wire 724 is connected to an end of the shielding body part 71 close to the second side area CB2.

In some embodiments, as shown in FIG. 12, in the case where there is one binding area BOD provided, the third connection wire 723 can be arranged in bypassed manner from the first side area CB1 to the fourth side area CB4, and then connected to the binding pin 273. The fourth connection wire 724 can be arranged in bypassed manner from the second side area CB2 to the fourth side area CB4, and then connected to the binding pin 273.

As shown in FIG. 13, in the case where there are two binding areas BOD provided, the third connection wire 723 close to the first binding area BOD1 can travel the trace wound from the first side area CB1 to the fourth side area CB4, and then connected to the binding pin 273 in the first binding area BOD1. The third connection wire 723 close to the second binding area BOD2 can travel the trace wound from the first side area CB1 to the third side area CB3, and then connected to the binding pin 273 in the second binding area BOD2. The fourth connection wire 724 close to the first binding area BOD1 can travel the trace wound from the second side area CB2 to the fourth side area CB4, and then connected to the binding pin 273 in the first binding area BOD1. The fourth connection wire 724 close to the second binding area BOD2 can travel the trace wound from the second side area CB2 to the third side area CB3, and then connected to the binding pin 273 in the second binding area BOD2.

The third connection wire 723 and the fourth connection wire 724 can be symmetrically arranged to ensure that the resistance of the third connection wire 723 is equal to the resistance of the fourth connection wire 724.

It should be noted that the third connection wire 723 can be provided as one, two, or more wires, as long as there is space in the side area CB, the third connection wire 723 can be arranged. Similarly, the fourth connection wire 724 can be provided as one, two, or more wires, as long as there is space in the side area CB, the fourth connection wire 724 can be arranged.

In some embodiments, in the case where there are two or more third connection wires 723 provided, the resistances of these two or more wires can be ensured by providing the lengths of the two or more third connection wires 723 to be the same, and the widths or thicknesses of the third connection wires 723 can also be adjusted to ensure that the resistances are the same. In some embodiments, in the case where there are two or more fourth connection wires 724 provided, the resistances of these two or more wires can be ensured by providing the lengths of the two or more fourth connection wires 724 to be the same, and the widths or thicknesses of the fourth connection wires 724 can also be adjusted to ensure that the resistances are the same.

It should be noted that the third connection wire 723 and the fourth connection wire 724 can be provided on the basis of the arrangement of the first connection wire 721 and the second connection wire 722, that is, the first connection wire 721, the second connection wire 722, the third connection wire 723, and the fourth connection wire 724 are simultaneously arranged on one display panel. The third connection wire 723 and the fourth connection wire 724 can be arranged on the display panel independent of the first connection wire 721 and the second connection wire 722, that is, the third connection wire 723 and the fourth connection wire 724 are simultaneously arranged on one display panel, without the arrangement of the first connection wire 721 and the second connection wire 722.

Figure 15:
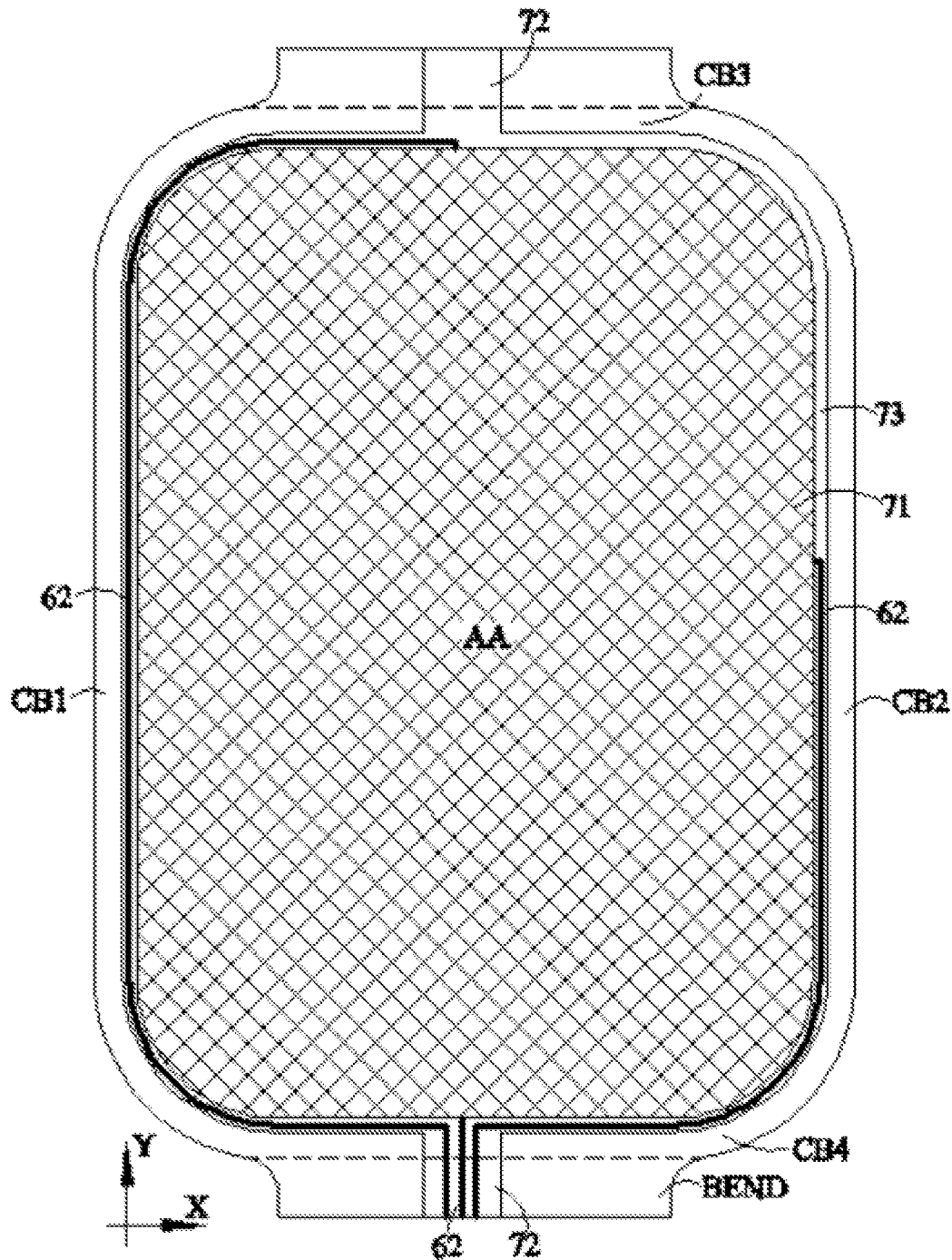
FIG. 15 is a schematic top view of a structure of an example shielding layer of a display panel according to some embodiments of the present disclosure.
Figure 19:
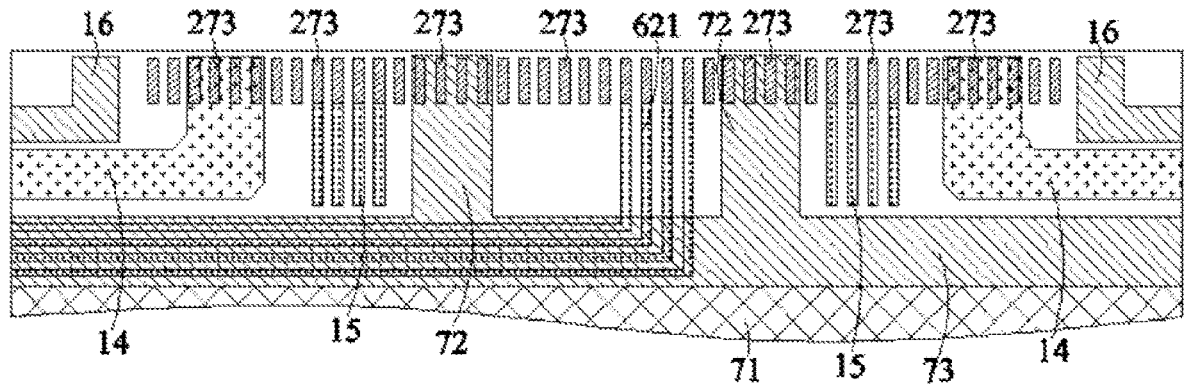
FIG. 19 is a schematic structural diagram of a second binding area in FIG. 16.
Figure 20:
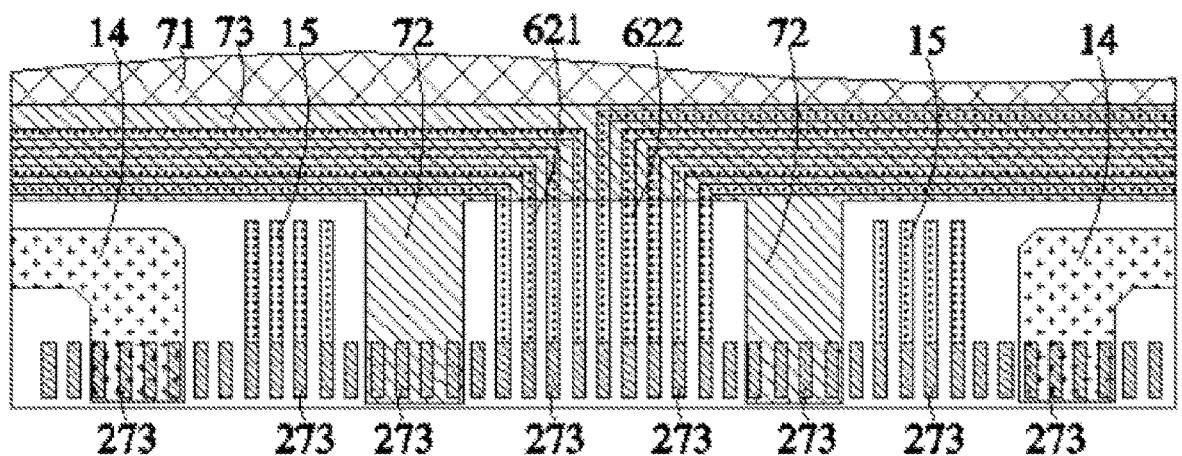
FIG. 20 is a schematic structural diagram of a first binding area in FIG. 15.

As shown in FIGS. 15, 19, and 20, the shielding layer 7 can further include a shielding connection part 73, and the shielding connection part 73 can be arranged around the shielding body part 71 and connected to the periphery of the shielding body part 71. That is, the shielding connection part 73 can be arranged as a circle around the shielding body part 71, the shielding connection part 73 can connect all outermost ends of the first metal wires 711 of the shielding body part 71 together, and the shielding connection wires 72 are connected to the shielding connection part 73. As a result, the shielding signal can be transmitted to the shielding connection part 73 through the shielding connection wires 72, and then transmitted to the shielding body part 71 through the shielding connection part 73, to ensure the uniformity of the shielding signal at each position of the shielding body part 71.

The shielding connection part 73 is arranged in the non-display area NA. Therefore, the shielding connection part 73 can be provided as a metal sheet structure, without the needing of a grid structure to be arranged on the shielding connection part 73 to avoid subpixels 35, further reducing the resistance of the shielding layer 7 and ensuring the shielding performance.

In some embodiments, the width of the shielding connection part 73 is greater than the width of the touch connection wire 62, so that the resistance of the shielding connection part 73 is reduced, thereby reducing the resistance of the shielding layer 7 and ensuring the shielding performance. In some embodiments, an orthographic projection of the touch connection wire 62 on the display substrate 100 overlaps with an orthographic projection of the shielding connection part 73 on the display substrate 100. In some embodiments, the orthographic projection of the touch connection wire 62, which is surrounding the touch body part 61, on the display substrate 100 is located within the orthographic projection of the shielding connection part 73 on the display substrate 100. However, since the touch connection wire 62 needs to be extended to the binding area BOD and connected to the binding pin 273, the orthographic projection of a portion of the touch connection wire 62, which is extending towards the binding area BOD, on the display substrate 100 does not overlap with the orthographic projection of the shielding connection part 73 on the display substrate 100. The touch connection wire 62 can be shielded through the shielding connection part 73, to prevent the signal on the first electrode 31 from affecting the signal on the touch connection wire 62, thereby further reducing the noise on the touch layer group 5.

Figure 16:
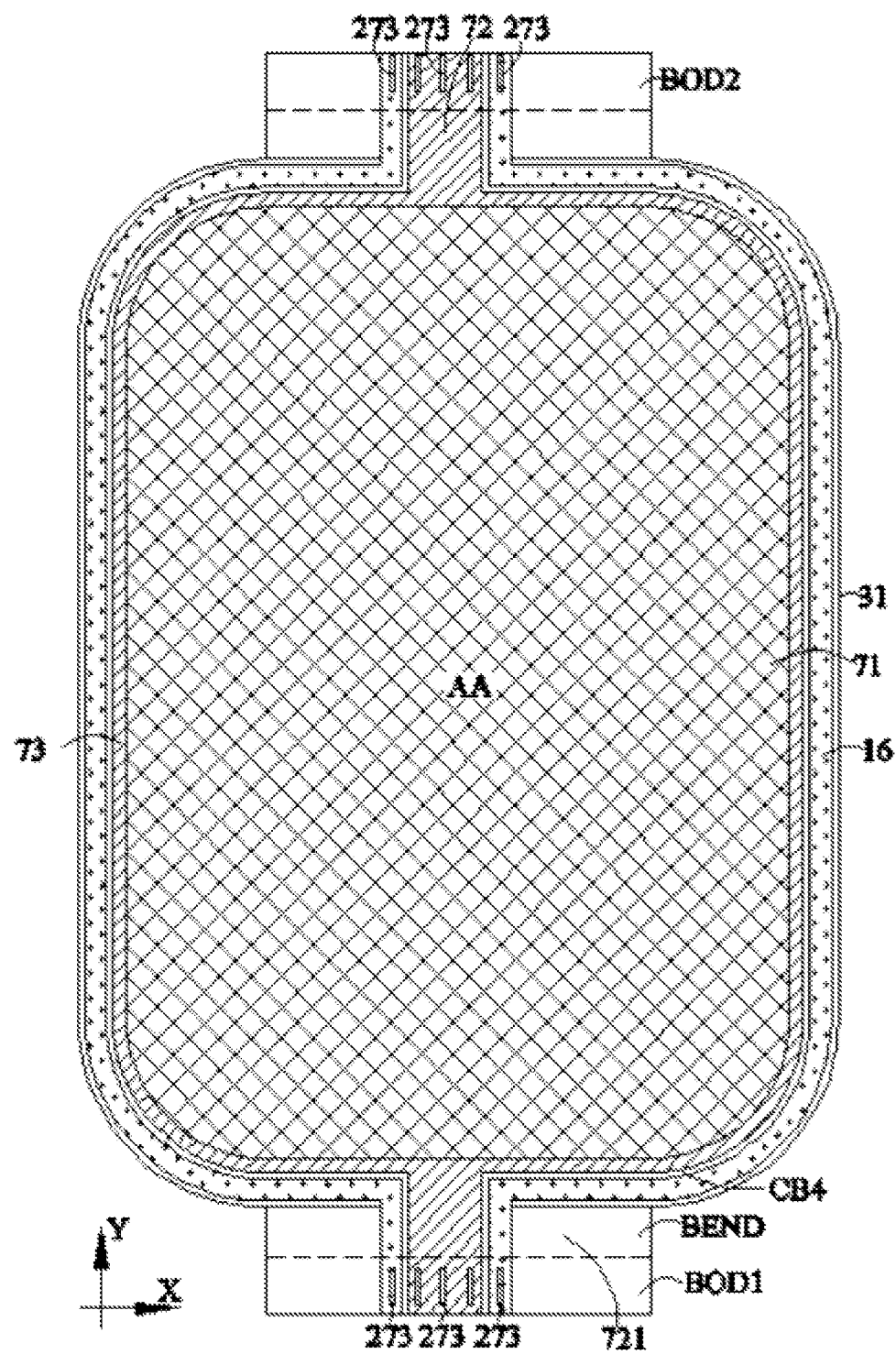
FIG. 16 is a schematic top view of a structure of an example shielding layer of a display panel according to some embodiments of the present disclosure.

In some embodiments, as shown in FIGS. 16 and 19, the display panel can further include a noise reduction layer 16. An orthographic projection of the noise reduction layer 16 on the display substrate 100 overlaps with the first electrode 31. The orthographic projection of the noise reduction layer 16 on the display substrate 100 is located on a side of the orthographic projection of the shielding layer 7 on the display substrate 100 away from the display area AA. That is, the noise reduction layer 16 is arranged on the periphery of the shielding layer 7.

The display panel can further include a signal generator, which can be connected to the noise reduction layer 16. The signal generator can be configured to provide a noise reduction signal the jumping of which is opposite to the data signal to the noise reduction layer 16, and the noise reduction signal is an AC signal. The signal generator can be a display driver chip 10, that is, the noise reduction signal can be calculated and outputted by the display driver chip 10.

The amplitude of the noise reduction signal $\Delta Vsl$ is $\Delta Vsl = -Cd*\Delta Vd/Csl$, where Cd is a capacitance value of a capacitor formed between all data lines 15 and the first electrode 31, $\Delta Vd$ is an average value of jumping voltages of the data signals on the data lines 15, and Csl is a capacitance value of a capacitor formed between the first electrode 31 and the noise reduction layer 16. Therefore, the amplitude of the noise reduction signal is determined by the capacitor formed between all data lines 15 and the first electrode 31, as well as the capacitor formed between the first electrode 31 and the noise reduction layer 16. The above values are theoretical values. Due to errors in process, equipment, and other factors, the amplitude of the noise reduction signal may have different values for different products, and can be compensated and adjusted after testing in actual products. By providing the noise reduction layer 16, the amplitude of the noise on the first electrode 31 can be actively reduced, thereby reducing the impact of the voltage jumping on the first electrode 31 on the touch layer group 5, and reducing the noise on the touch layer group 5.

In some embodiments, it can be obtained from the above formula that the capacitance value of the capacitor formed between the noise reduction layer 16 and the first electrode 31 is inversely proportional to the amplitude of the noise reduction signal. Therefore, the larger the capacitance value of the capacitor formed between the noise reduction layer 16 and the first electrode 31 is, the more favorable it is to reduce the amplitude of the noise on the first electrode 31. The larger the overlapping area between the noise reduction layer 16 and the first electrode 31 is, the greater the capacitor formed between the noise reduction layer 16 and the first electrode 31 is, and the better the shielding effect is. Therefore, the area of the noise reduction layer 16 is, where allowed, provided to be relatively large.

Figure 17:
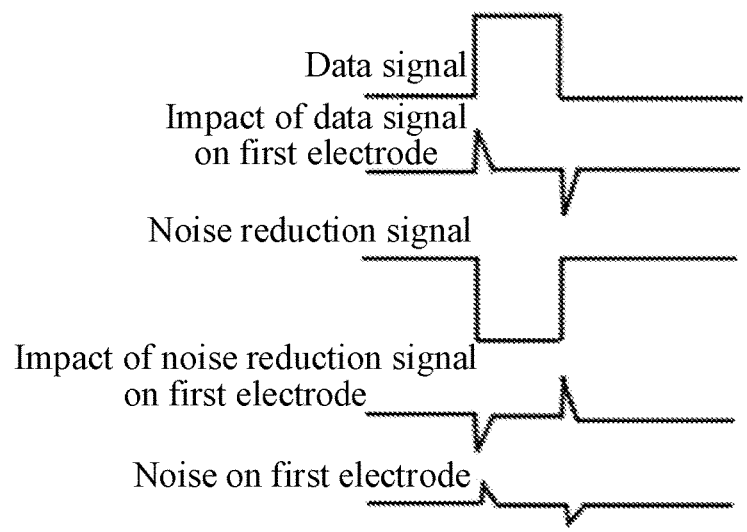
FIG. 17 is a schematic diagram of a noise signal generated by a data signal and a noise reduction signal on a first electrode.

As shown in FIG. 17, when the jumping of the data signal occurs, the jumping of the voltage on the first electrode 31 also occurs to generate noise, which forms sharp peaks and valleys. After the noise reduction signal whose jumping direction is opposite to the data signal is inputted to the noise reduction layer 16, the noise reduction signal causes the voltage jumping on the first electrode 31, whose jumping direction is opposite to that of the noise signal. Therefore, the noise is partially offset, and the noise can be reduced.

The specific arrangement of the noise reduction layer 16 is as follows: the noise reduction layer 16 can be arranged in the same layer and using the same material as the shielding layer 7, that is, the noise reduction layer 16 and the shielding layer 7 can be arranged in the same layer and formed through the same patterning process.

Figure 18:
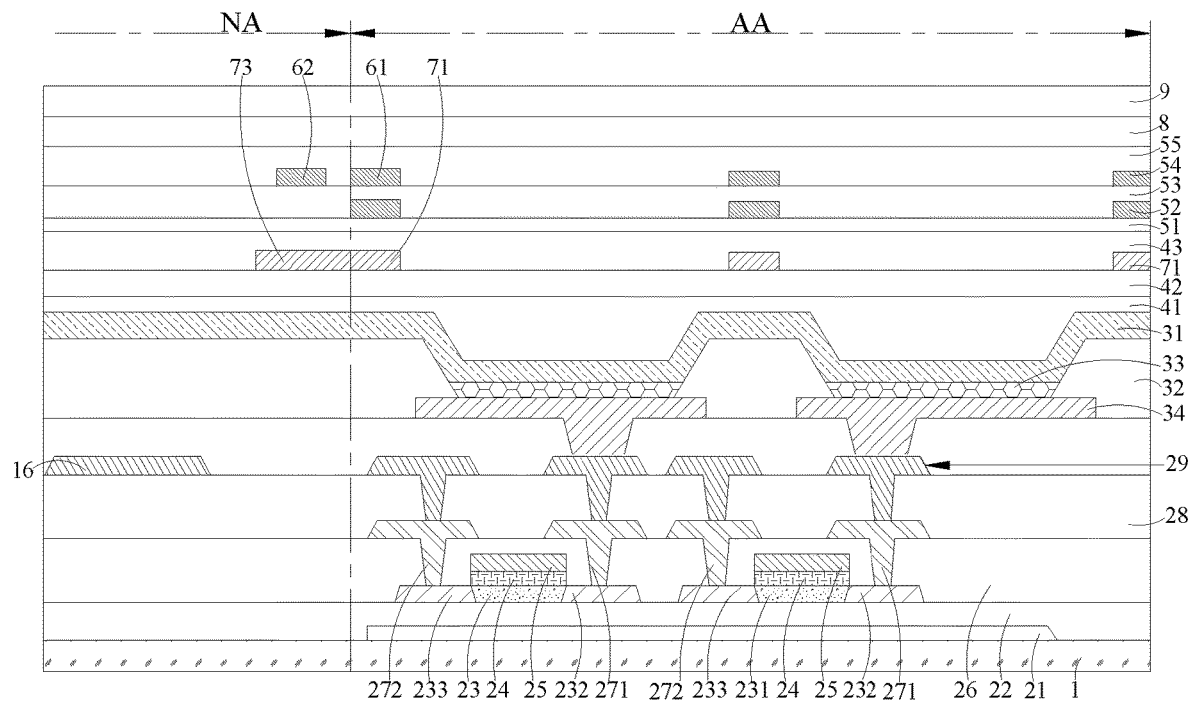
FIG. 18 is a schematic cross-sectional view of an example display panel in FIG. 1.

In some embodiments of the present disclosure, the noise reduction layer 16 can be arranged in the same layer and using the same material as the first connection conductor layer 27, which can also actively reduce the amplitude of noise on the first electrode 31, thereby reducing the impact of the voltage jumping on the first electrode 31 on the touch layer group 5, and reducing the noise on the touch layer group 5. That is, the noise reduction layer 16 can be arranged in the same layer as the source connection line 271 and the drain connection line 272, and formed through the same patterning process. In some embodiments, as shown in FIG. 18, in the case where the display substrate 100 further includes a second connection conductor layer 29, the noise reduction layer 16 can be arranged in the same layer and using the same material as the second connection conductor layer 29. That is, the noise reduction layer 16 can be arranged in the same layer as the second source connection line and the second drain connection line, and formed through the same patterning process. The noise reduction layer 16 can also be arranged in the same layer and using the same material as the first connection conductor layer 27. That is, the noise reduction layer 16 can be arranged in the same layer as the source connection line 271 and the drain connection line 272, and formed through the same patterning process. In the case where the display substrate 100 further includes a third connection conductor layer and a fourth connection conductor layer, the noise reduction layer 16 can be arranged in the same layer and using the same material as the third connection conductor layer and the fourth connection conductor layer. That is, the noise reduction layer 16 can be arranged in the same layer as the third source connection line and the third drain connection line, or arranged in the same layer as the fourth source connection line and the fourth drain connection line, and formed through the same patterning process.

It should be noted that in the case where a connection conductor layer is provided as at least two layers, i.e. in the case where the connection conductor layer includes a first connection conductor layer 27 and a second connection conductor layer 29, the noise reduction layer 16 is arranged in the same layer and using the same material as a connection conductor layer closest to the first electrode 31. For example, in the case where the display substrate 100 further includes the second connection conductor layer 29, the second connection conductor layer 29 is arranged on a side of the first connection conductor layer 27 away from the base substrate 1, and the noise reduction layer 16 can be arranged in the same layer and using the same material as the second connection conductor layer 29. In the case where the display substrate 100 further includes the third connection conductor layer, the third connection conductor layer is arranged on a side of the second connection conductor layer 29 away from the base substrate, and the noise reduction layer 16 can be arranged in the same layer and using the same material as the third connection conductor layer.

Such arrangement allows a distance between the noise reduction layer 16 and the first electrode 31 to be closer, resulting in a larger capacitor between the noise reduction layer 16 and the first electrode 31, and improving the noise reduction effect of the noise reduction layer 16.

As shown in FIGS. 19 and 20, it can be seen that the width of the shielding connection wire 72 is basically the same as the width of the first power connection line 14, and the width of the data line 15 is basically the same as the width of the first touch connection wire 621 and the width of the second touch connection wire 622. In some embodiments, the width of the shielding connection wire 72 is much larger than the width of the first touch connection wire 621. For example, the width of the shielding connection wire 72 can be more than five times the width of the first touch connection wire 621. The maximum width can be achieved as much as possible if the frame allows.

As shown in FIG. 19, the binding pins for the noise reduction layer 16 are arranged on an outer side of the first power connection line.

It should be noted that the numbers of the shielding connection wires 72, the first power connection lines 14, the data lines 15, the first touch connection wires 621, and the second touch connection wires 622 in FIGS. 19 and 20 are only an example and does not constitute a limitation of the present disclosure. The specific number can be set according to needs.

Figure 21:
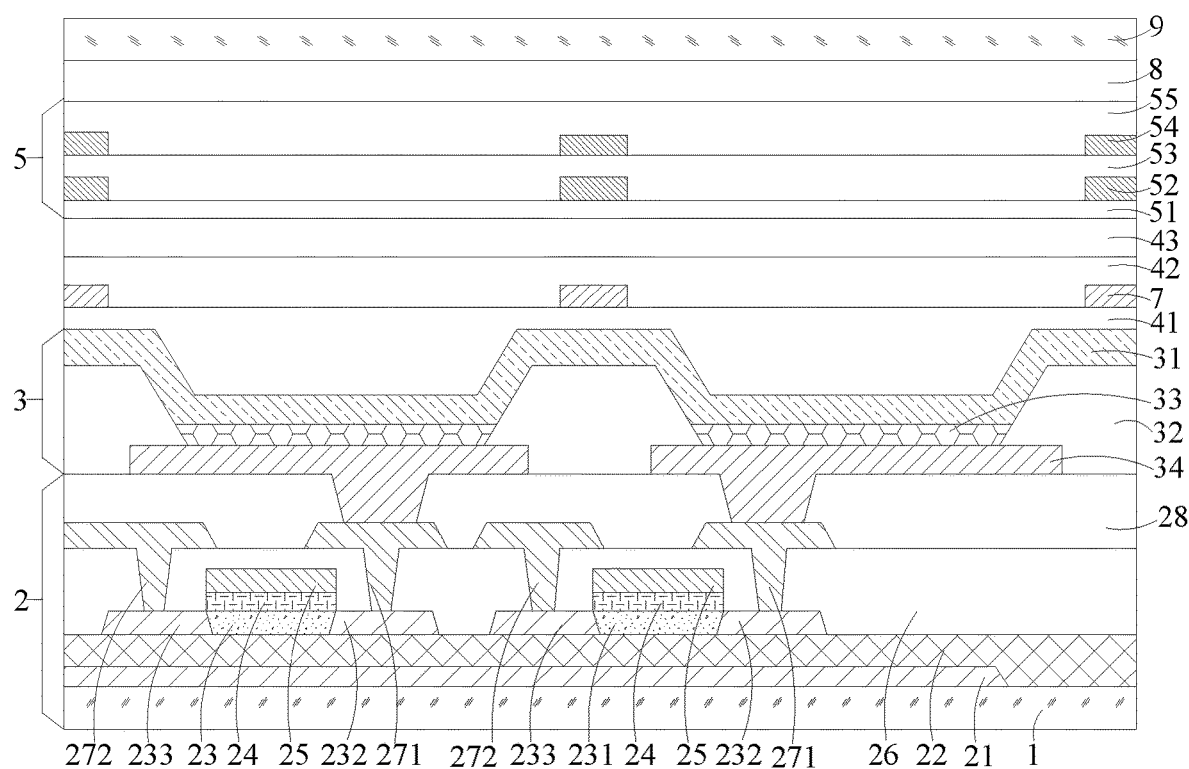
FIG. 21 is a schematic cross-sectional view of a structure of an example display area of the display panel in FIG. 1.
Figure 22:
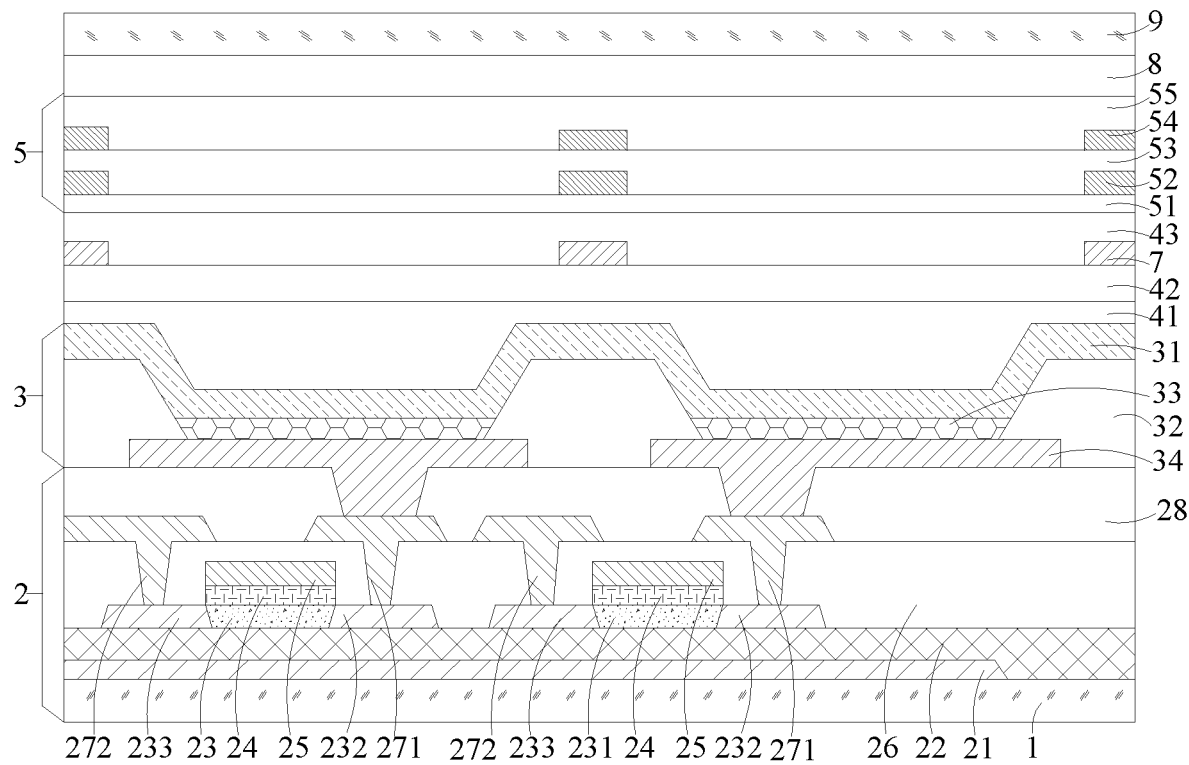
FIG. 22 is a schematic cross-sectional view of a structure of an example display area of the display panel in FIG. 1.
Figure 23:
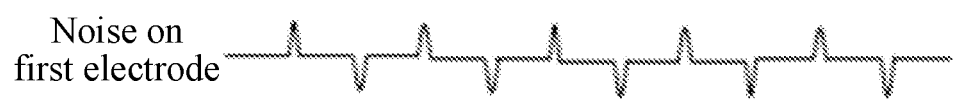
FIG. 23 is a schematic diagram of a waveform of a noise signal on a first electrode.

The shielding layer 7 can be arranged between the film layers of the encapsulation layer group 4. In some embodiments, as shown in FIG. 21, the shielding layer 7 can be arranged between the first inorganic layer 41 and the organic layer 42. Alternatively, as shown in FIG. 22, the shielding layer 7 can be arranged between the organic layer 42 and the second inorganic layer 43.

In some embodiments, as shown in FIG. 3, the shielding layer 7 can also be arranged on a side of the encapsulation layer group 4 away from the base substrate 1, that is, the shielding layer 7 can also be arranged between the encapsulation layer group 4 and the touch layer group 5.

In some embodiments, when the shielding layer 7 is arranged in different positions, i.e. when the shielding layer 7 is arranged between different film layers, the width of the first metal wire 711 of the shielding layer 7 can vary. In some embodiments, the width of the first metal wire 711 of the shielding layer 7 decreases as a distance between the shielding layer 7 and the light-emitting substrate 3 increases. The closer the shielding layer 7 is from the light-emitting substrate 3, the smaller a distance between the shielding layer 7 and the subpixel 35 is, and the smaller a diffusion area of the light emitted by the subpixel 35 is. Therefore, the width of the first metal wire 711 of the shielding layer 7 can be provided to be wider, so that the shielding layer 7 will not block the light emitted by the subpixel 35 and will not affect the light output efficiency of the display panel. The resistance of the shielding layer 7 is smaller, resulting in better shielding effect. For example, the width of the first metal wire 711 of the shielding layer 7 in FIG. 3 is the smallest, the width of the first metal wire 711 of the shielding layer 7 in FIG. 21 is the largest, and the width of the first metal wire 711 of the shielding layer 7 in FIG. 22 is moderate.

The width of the first metal wire 711 is greater than or equal to 5 microns but less than or equal to 25 microns. The width of the shielding connection wire 72 is greater than or equal to 200 microns.

The shielding layer 7 can include a first conductive layer, a second conductive layer, and a third conductive layer arranged in stacked manner in sequence. The materials of the first conductive layer and the third conductive layer can be titanium (Ti), and the material of the second conductive layer can be aluminum (AL). That is, the shielding layer 7 can be a stacked structure of TiALTi. In some embodiments, the shielding layer 7 can also be a stacked structure of Mo/Al/Mo, Mo/AlGe/Mo, or Ti/Cu. The shielding layer 7 can also be a single-layer metal structure.

The material of the shielding layer 7 can also be transparent conductive materials. In this case, the shielding body part 71 can be provided as an integral layer. That is, there is no need of providing grid holes corresponding to the subpixels 35 on the shielding body part 71, and the light emitted by the subpixels 35 can directly pass through the transparent conductive material.

In some embodiments, the material of the touch body part 61 can also be transparent conductive materials. In this case, the touch body part 61 is arranged in a whole layer. That is, there is no need of providing grid holes corresponding to the subpixels 35 on the touch body part 61, and the light emitted by the subpixels 35 can directly pass through the transparent conductive material.

All of the touch connection wire 62, the shielding connection wire 72, the data line 15, and the first power connection line 14 need to be bound to other external devices in the binding area. In some embodiments, the touch connection wire 62 extends to the binding area BOD and forms a touch binding pin 623 in the binding area BOD. The shield connection wire 72 extends to the binding area BOD and forms a shield binding pin 725 in the binding area BOD. The data line 15 extends to the binding area BOD and forms a data binding pin 151 in the binding area BOD. The first power connection line 14 extends to the binding area BOD and forms a first power binding pin 141 in the binding area BOD. In some embodiments, at least one layer of the touch binding pin 623, the shielding binding pin 725, the data binding pin 151, and the first power binding pin 141 are arranged in the same layer and using the same material. Such arrangement ensures that all binding pins are arranged in the same layer, with the height being the same, which is convenient for binding and has a good binding effect.

Figure 25:
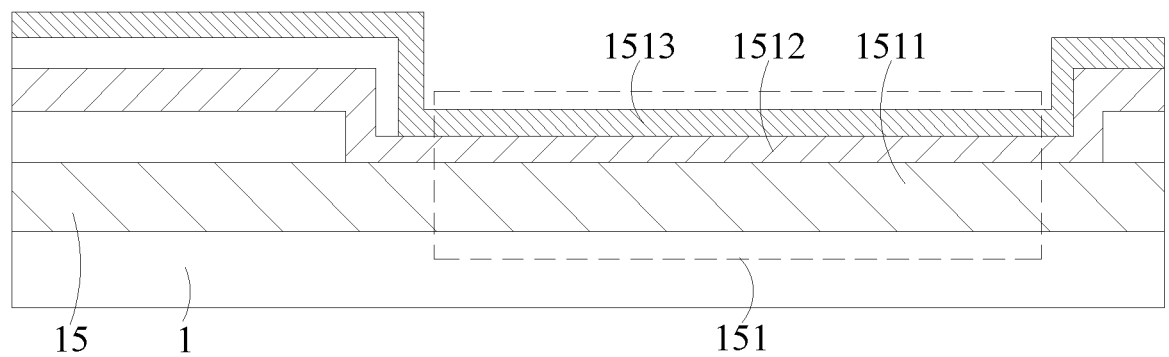
FIG. 25 is a schematic structural diagram of a data binding pin.
Figure 26:
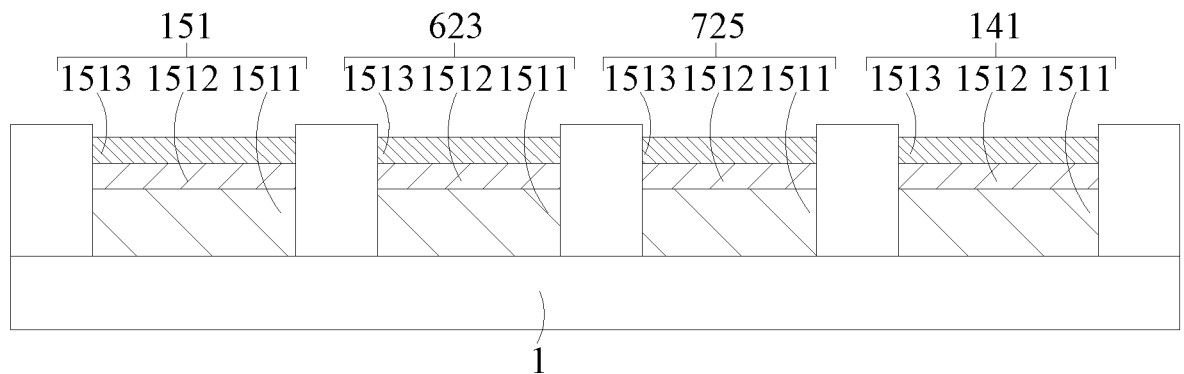
FIG. 26 is a schematic structural diagram of a data binding pin, a touch binding pin, a shielding binding pin, and a first power binding pin.

As shown in FIGS. 25 and 26, the data line 15 extends to the binding area BOD, and forms the data binding pin 151 in the binding area BOD. The data binding pin 151 can include a first layer 1511, a second layer 1512, and a third layer 1513. The first layer 1511 of the data binding pin 151 is a portion of the data line 15 extending to the binding area BOD. The second layer 1512 of the data binding pin 151 is arranged in the same layer and using the same material as the shielding connection wire 72, and the second layer 1512 of the data binding pin 151 is disconnected from the shielding connection wire 72. The third layer 1513 of the data binding pin 151 is arranged in the same layer and using the same material as the touch connection wire 62.

The touch binding pin 623 can include the above three layers, but the first layer 1511 of the touch binding pin 623 is disconnected from the data line 15, and is arranged only in the same layer and using the same material as the data line 15. The second layer 1512 of the touch binding pin 623 is also arranged in the same layer and using the same material as the shielding connection wire 72, and the second layer 1512 of the touch binding pin 623 is disconnected from the shielding connection wire 72. In some embodiments, the touch binding pin 623 can include only a layer of the touch connection wire 62 extending to the binding area BOD.

The shielding binding pin 725 can include the above three layers, but the first layer 1511 of the shielding binding pin 725 is disconnected from the data line 15, and is arranged only in the same layer and using the same material as the data line 15. The third layer 1513 of the shielding binding pin 725 is disconnected from the touch connection wire 62, and is arranged only in the same layer and using the same material as the touch connection wire 62. In some embodiments, the shielding binding pin 725 can also include a portion of the shielding connection wire 72 extending to the binding area BOD, as well as the third layer 1513 mentioned above.

The first power binding pin 141 can include the above three layers, and the first power connection line 14 can be connected to any of the three layers in a transferring manner. However, the first layer 1511 of the first power binding pin 141 is disconnected from the data line 15, and is arranged only in the same layer and using the same material as the data line 15. The second layer 1512 of the first power binding pin 141 is also arranged in the same layer and using the same material as the shielding connection wire 72, and the second layer 1512 of the first power binding pin 141 is disconnected from the shielding connection wire 72. The third layer 1513 of the first power binding pin 141 is disconnected from the touch connection wire 62, and is arranged only in the same layer and using the same material as the touch connection wire 62. In some embodiments, any of the three layers mentioned above can be replaced by a portion of the first power connection line 14 extending to the binding area BOD. In some embodiments, the first power binding pin 141 can also include a portion of the first power connection line 14 extending to the binding area BOD, as well as the third layer 1513 mentioned above.

The touch binding pin 623, the shielding binding pin 725, the data binding pin 151, and the first power binding pin 141 can also be other structures, which will not be explained here.

Based on the same inventive idea, embodiments of the present disclosure also provide a display panel. The display panel can include a base substrate 1, a driving backplane 2, a light-emitting substrate 3, a touch layer group 5, a shielding layer 7, and a noise reduction layer 16. The drive backplane 2 is arranged on one side of the base substrate 1. The light-emitting substrate 3 is arranged on a side of the driving backplane 2 away from the base substrate 1. The light-emitting substrate 3 can include a second electrode 34, a light-emitting layer group 33, and a first electrode 31 arranged in stacked manner in sequence. The touch layer group 5 is arranged on a side of the light-emitting substrate 3 away from the base substrate 1. The touch layer group 5 can include a touch body part 61 and a touch connection wire 62, which is connected to the touch body part 61. The shielding layer 7 is arranged between the first electrode 31 and the touch layer group 5, and the shielding layer 7 is configured to enable a DC signal to be inputted. An orthographic projection of the noise reduction layer 16 on the base substrate 1 is located on a side where an orthographic projection of the shielding layer 7 on the base substrate 1 away from the display area AA. The noise reduction layer 16 is configured to enable an AC signal to be inputted.

The shielding layer 7 and the noise reduction layer 16 can reduce the impact of the voltage fluctuation on the first electrode 31 on the touch layer group 5, reduce the noise generated in the touch layer group 5, and improve the touch effect.

In some embodiments, both an orthographic projection of the shielding layer 7 on the base substrate 1 and an orthographic projection of the noise reduction layer 16 on the base substrate 1 are located within an orthographic projection of the first electrode 31 on the base substrate 1.

In some embodiments, the shielding layer 7 and the noise reduction layer 16 are arranged in the same layer and using the same material.

In some embodiments, the display panel can further include a signal generator, the signal generator is connected to the shielding layer 7, and the signal generator is configured to provide a constant voltage to the shielding layer 7. The signal generator is also connected to the noise reduction layer 16, and the signal generator is configured provide a noise reduction signal whose jumping is opposite to the data signal to the noise reduction layer 16.

It should be noted that the specific structures of the base substrate 1, the driver backplane 2, the light-emitting substrate 3, the encapsulation layer group 4, the touch layer group 5, the shielding layer 7, and the noise reduction layer 16 mentioned above can all be applicable to the display panel. The specific structures of the base substrate 1, the driver backplane 2, the light-emitting substrate 3, the encapsulation layer group 4, the touch layer group 5, the shielding layer 7, and the noise reduction layer 16 have been explained in detail in the above, which will not be repeated here.

Based on the same inventive idea, embodiments of the present disclosure also provide a display device, which can include any of the display panels described above. The specific structure of the display panel has been described in detail in the above, which will not be repeated here.

In some embodiments, the display device can further include an active pen 13, which can be used in conjunction with the touch layer group 5 to generate touch signals.

The specific type of display device is not limited specially in the present disclosure, and commonly used types of the display device in the art can be permitted. For example, the display device can be mobile devices such as mobile phones, wearable devices such as watches, VR devices, etc. Those skilled in the art can select correspondingly based on the specific use of the display device, which will not be repeated here.

It should be noted that in addition to the display panel, the display device can also include other necessary components and assemblies. For example, taking the display as an example, the display includes a housing, a circuit board, a power cord, etc. Those skilled in the art can supplement accordingly according to the specific use requirements of the display device, which will not be repeated here.

Compared with the prior art, the beneficial effects of the display device provided by embodiments of the present disclosure are the same as those of the display panel provided by aforementioned embodiments, which will not be repeated here.

After considering the specification and practicing of the invention disclosed herein, those skilled in the art will easily come up with other implementation solutions of the present disclosure. The present disclosure aims to cover any variations, uses, or adaptive changes of the present disclosure, which follow the general principles of the present disclosure and include common knowledge or commonly used technical means in the art that are not disclosed in the present disclosure. The specification and embodiments are only considered exemplary, and the true scope and spirit of the present disclosure are defined by appended claims.

What is claimed is:

1. A display panel, comprising:
   a display substrate comprising a first electrode;
   a touch layer group arranged on a light output side of the display substrate, wherein the touch layer group comprises a touch body part and a touch connection wire, and the touch connection wire is connected to the touch body part; and
   a shielding layer arranged between the first electrode and the touch layer group, wherein the shielding layer comprises a shielding body part and a shielding connection wire, the shielding connection wire is connected to the shielding body part, and a width of the shielding connection wire is greater than a width of the touch connection wire.

2. The display panel according to claim 1, wherein the shielding connection wire is provided as at least two shielding connection wires, and resistances of the at least two shielding connection wires are substantially the same.

3. The display panel according to claim 2, wherein the display panel comprises a display area and one binding area, the binding area is arranged on one side of the display area, the shielding body part is arranged in the display area, and at least two binding pins are arranged in the binding area, and wherein the shielding connection wire comprises:
   a first connection wire, wherein one end of the first connection wire is connected to a portion of the binding pins, and the other end of the first connection wire is connected to an end of the shielding body part close to the binding area; and
   a second connection wire, wherein one end of the second connection wire is connected to a portion of the binding pins, the other end of the second connection wire is connected to an end of the shielding body part away from the binding area, and a resistance of the second connection wire is substantially equal to a resistance of the first connection wire.

4. The display panel according to claim 3, wherein a length of the display area along a second direction is greater than a width of the display area along a first direction, the binding area is arranged on a side of the display area along the second direction, the first direction intersects with the second direction, and the first direction and the second direction are parallel to a surface of the display substrate close to the touch layer group.

5. The display panel according to claim 2, wherein the display panel comprises a display area, a first binding area, and a second binding area, the first binding area and the second binding area are arranged on opposite sides of the display area, and the shielding body part is arranged in the display area, and wherein the shielding connection wire comprises:
   a first connection wire, wherein one end of the first connection wire is connected to a binding pin in the first binding area, and the other end of the first connection wire is connected to an end of the shielding body part close to the first binding area; and
   a second connection wire, wherein one end of the second connection wire is connected to a binding pin in the second binding area, the other end of the second connection wire is connected to an end of the shielding body part close to the second binding area, and a resistance of the second connection wire is substantially equal to a resistance of the first connection wire.

6. The display panel according to claim 5, wherein a length of the display area along a second direction is greater than a width of the display area along a first direction, the first binding area and the second binding area are arranged on opposite sides of the display area along the second direction, the first direction intersects with the second direction, and the first direction and the second direction are parallel to a surface of the display substrate close to the touch layer group.

7. The display panel according to claim 3, wherein the display panel further comprises a first side area and a second side area, the first side area and the second side area are arranged on opposite sides of the display area along a first direction, the binding area is arranged on at least one side of the display area along a second direction, and the first direction intersects with the second direction, and wherein the shielding connection wire further comprises:
   a third connection wire, wherein one end of the third connection wire is connected to a binding pin in the binding area, and the other end of the third connection wire is connected to an end of the shielding body part close to the first side area; and
   a fourth connection wire, wherein one end of the fourth connection wire is connected to a binding pin in the binding area, the other end of the fourth connection wire is connected to an end of the shielding body part close to the second side area, a resistance of the third connection wire is equal to a resistance of the fourth connection wire, and the resistance of the third connection wire is equal to the resistance of the first connection wire.

8. The display panel according to claim 1, wherein the shielding connection wire is grounded or connected to a constant voltage terminal.

9. The display panel according to claim 1, wherein the display panel further comprises:
a signal generator connected to the shielding connection wire, wherein the signal generator is configured to provide a shielding signal to the shielding layer, the shielding signal is opposite to a data signal of the display substrate, and an amplitude of the shielding signal is smaller than an amplitude of the data signal.

10. The display panel according to claim 1, wherein the shielding body part comprises:
multiple first metal wires interwoven to form multiple first grids, subpixels of the display substrate are located within orthographic projections of the first grids on the display substrate, and a width of the shielding connection wire is greater than a width of a first metal wire.

11. The display panel according to claim 10, wherein the touch body part comprises:
multiple second metal wires interwoven to form multiple second grids, the subpixels of the display substrate are located within orthographic projections of the second grids on the display substrate, and the width of the first metal wire is greater than or equal to a width of a second metal wire.

12. The display panel according to claim 11, wherein orthographic projections of the second metal wires on the display substrate are located within orthographic projections of the first metal wires on the display substrate.

13. The display panel according to claim 1, wherein the shielding layer further comprises:
a shielding connection part arranged around the shielding body part, wherein the shielding connection part is connected to a periphery of the shielding body part, and the shielding connection wire is connected to the shielding connection part.

14. The display panel according to claim 13, wherein a width of the shielding connection part is greater than a width of the touch connection wire.

15. The display panel according to claim 14, wherein an orthographic projection of the touch connection wire on the display substrate overlaps with an orthographic projection of the shielding connection part on the display substrate.

16. The display panel according to claim 1, wherein the display panel further comprises:
a noise reduction layer, wherein an orthographic projection of the noise reduction layer on the display substrate overlaps with the first electrode, and the orthographic projection of the noise reduction layer on the display substrate is located on a side of an orthographic projection of the shielding layer on the display substrate away from the display area.

17. The display panel according to claim 16, wherein the display panel further comprises:
a signal generator connected to the noise reduction layer, wherein the noise reduction layer is configured to provide a noise reduction signal opposite to a jumping direction of a data signal to the noise reduction layer.

18. The display panel according to claim 17, wherein an amplitude of the noise reduction signal $\Delta Vsl$ is $\Delta Vsl = -Cd*\Delta Vd/Csl$, where $Cd$ is a capacitance value of a capacitor formed between all data lines and the first electrode, $\Delta Vd$ is an average value of jumping voltages of data signals on the data lines, and $Csl$ is a capacitance value of a capacitor formed between the first electrode and the noise reduction layer.

19. The display panel according to claim 16, wherein the noise reduction layer and the shielding layer are arranged in the same layer and using the same material.

20. The display panel according to claim 16, wherein the display substrate comprises:
a base substrate;
a driving backplane arranged on a side of the base substrate, wherein the driving backplane comprises a source and a drain, the driving backplane further comprises at least one connection conductor layer connected to the source or the drain, and the noise reduction layer is arranged in the same layer and using the same material as the connection conductor layer;
a light-emitting substrate arranged on a side of the driving backplane away from the base substrate, wherein the light-emitting substrate comprises the first electrode; and
an encapsulation layer group arranged on a side of the light-emitting substrate away from the base substrate, wherein the touch layer group is arranged on a side of the encapsulation layer group away from the base substrate.

21. The display panel according to claim 20, wherein the connection conductor layer is provided as at least two layers, and the noise reduction layer is arranged in the same layer and using the same material as the connection conductor layer closest to the first electrode.

22. The display panel according to claim 20, wherein the shielding layer is arranged between film layers of the encapsulation layer group, or the shielding layer is arranged between the encapsulation layer group and the touch layer group, and a width of a first metal wire of the shielding layer decreases as a distance between the shielding layer and the light-emitting substrate increases.

23. The display panel according to claim 20, wherein the encapsulation layer group comprises:
a first inorganic layer arranged on a side of the light-emitting substrate away from the base substrate;
an organic layer arranged on a side of the first inorganic layer away from the base substrate; and
a second inorganic layer arranged on a side of the organic layer away from the base substrate; and
wherein the shielding layer is arranged between the first inorganic layer and the organic layer, or the shielding layer is arranged between the organic layer and the second inorganic layer.

24. A display panel, comprising:
a base substrate;
a driving backplane arranged on a side of the base substrate;
a light-emitting substrate arranged on a side of the driving backplane away from the base substrate, wherein the light-emitting substrate comprises a second electrode, a light-emitting layer group, and a first electrode arranged in stacked manner in sequence;
a touch layer group arranged on a side of the light-emitting substrate away from the base substrate, wherein the touch layer group comprises a touch body part and a touch connection wire, and the touch connection wire is connected to the touch body part;
a shielding layer arranged between the first electrode and the touch layer group, wherein the shielding layer is configured to enable a direct current (DC) signal to be inputted; and a noise reduction layer, wherein an orthographic projection of the noise reduction layer on the base substrate is located on a side of an orthographic projection of the shielding layer on the base substrate away from a display area, and the noise reduction layer is configured to enable an alternating current (AC) signal to be inputted.

25. A display device comprising the display panel according to claim 1.

* * * * *